May 30, 1967 R. A. ERICKSON ET AL 3,323,059
AUTOMATIC TEST APPARATUS FOR DISPLAYING SEMICONDUCTOR
DEVICE CHARACTERISTIC CURVES
Filed April 27, 1964 13 Sheets-Sheet 1

INVENTORS
ROBERT A. ERICKSON
HARVEY N. SHORT
ROGER V. GILLETTE
BY
ATTORNEYS

May 30, 1967 R. A. ERICKSON ET AL 3,323,059
AUTOMATIC TEST APPARATUS FOR DISPLAYING SEMICONDUCTOR
DEVICE CHARACTERISTIC CURVES
Filed April 27, 1964 13 Sheets-Sheet 3

INVENTORS
ROBERT A. ERICKSON
HARVEY N. SHORT
ROGER V. GILLETTE
BY
ATTORNEYS

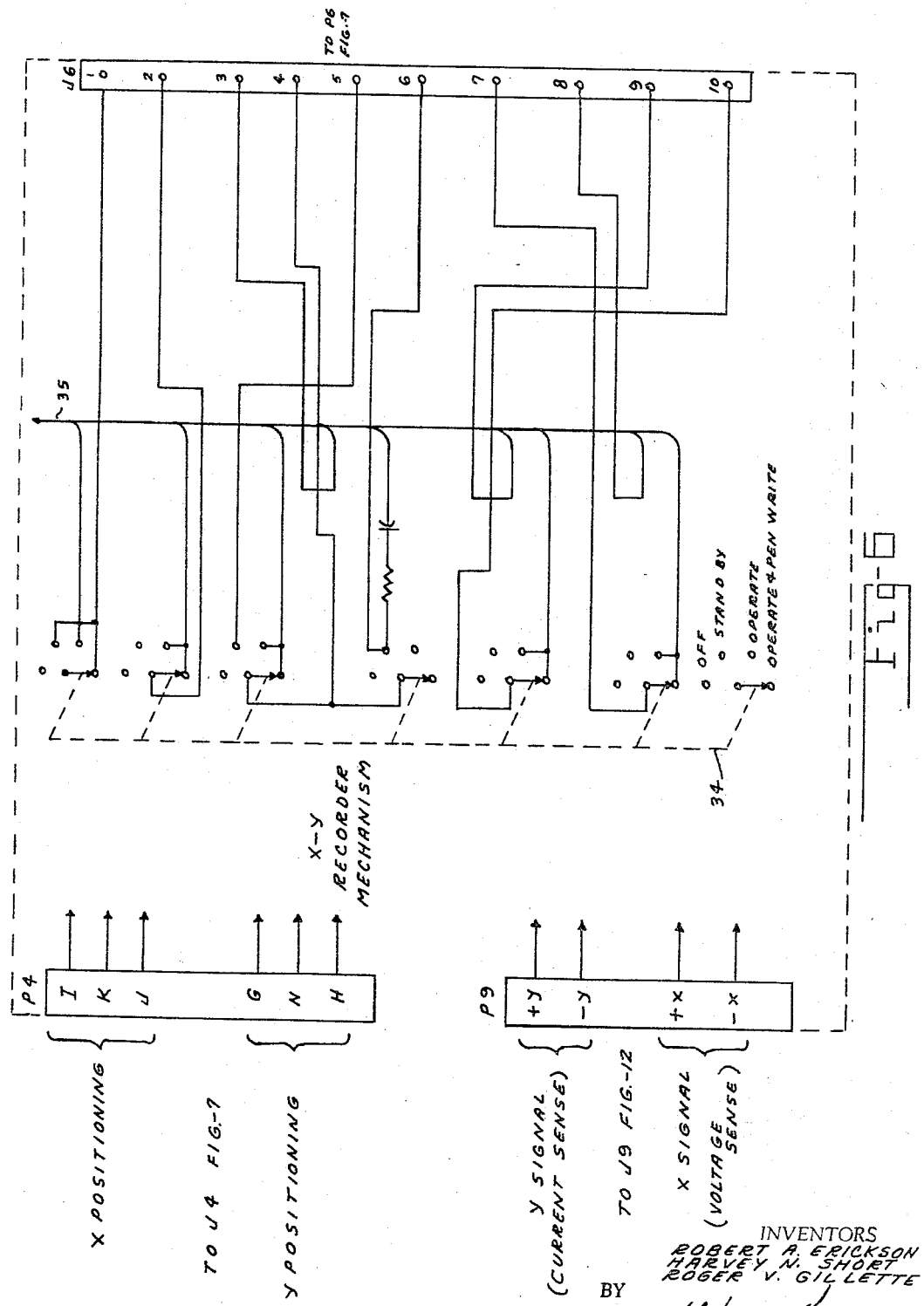

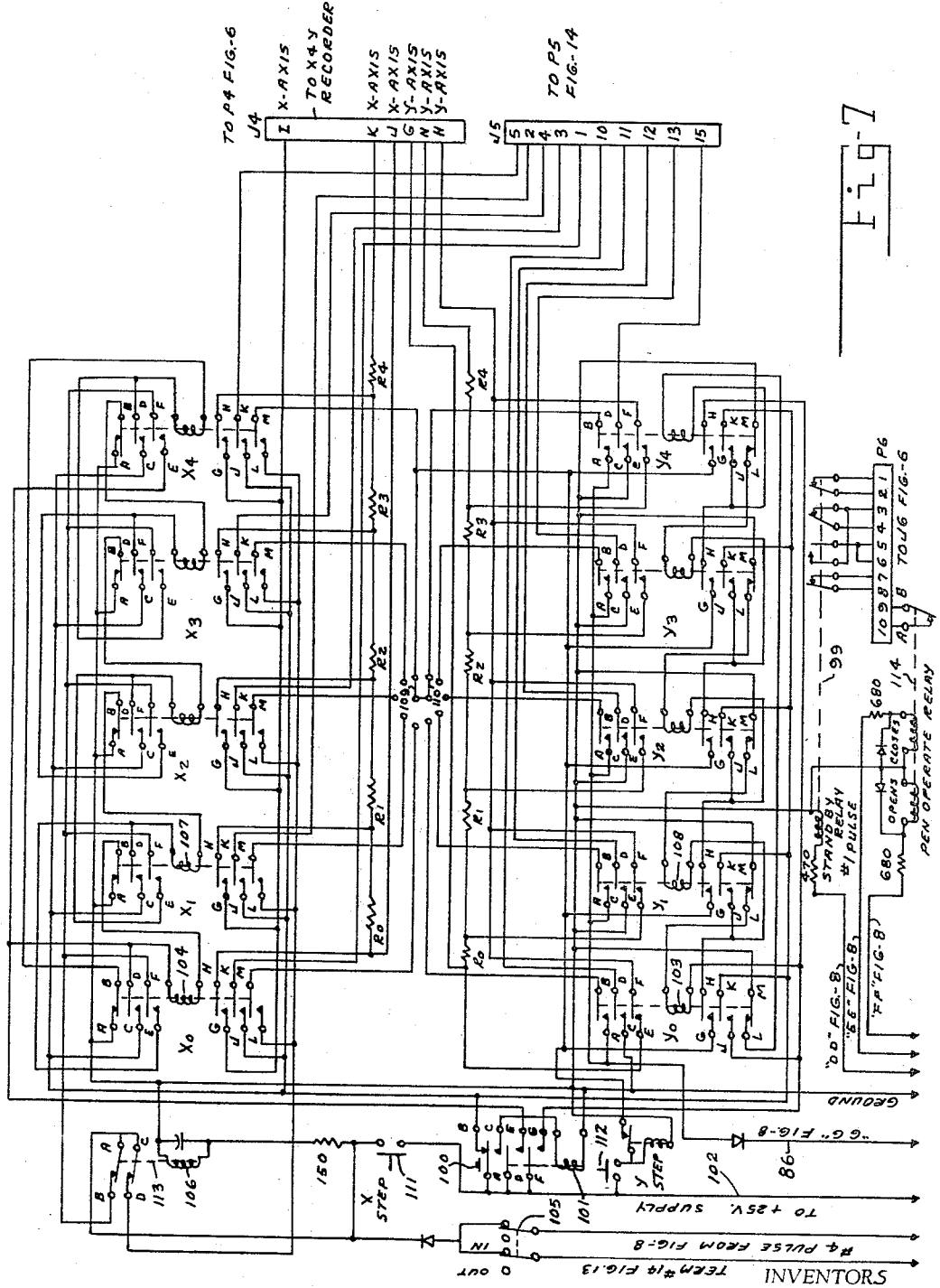

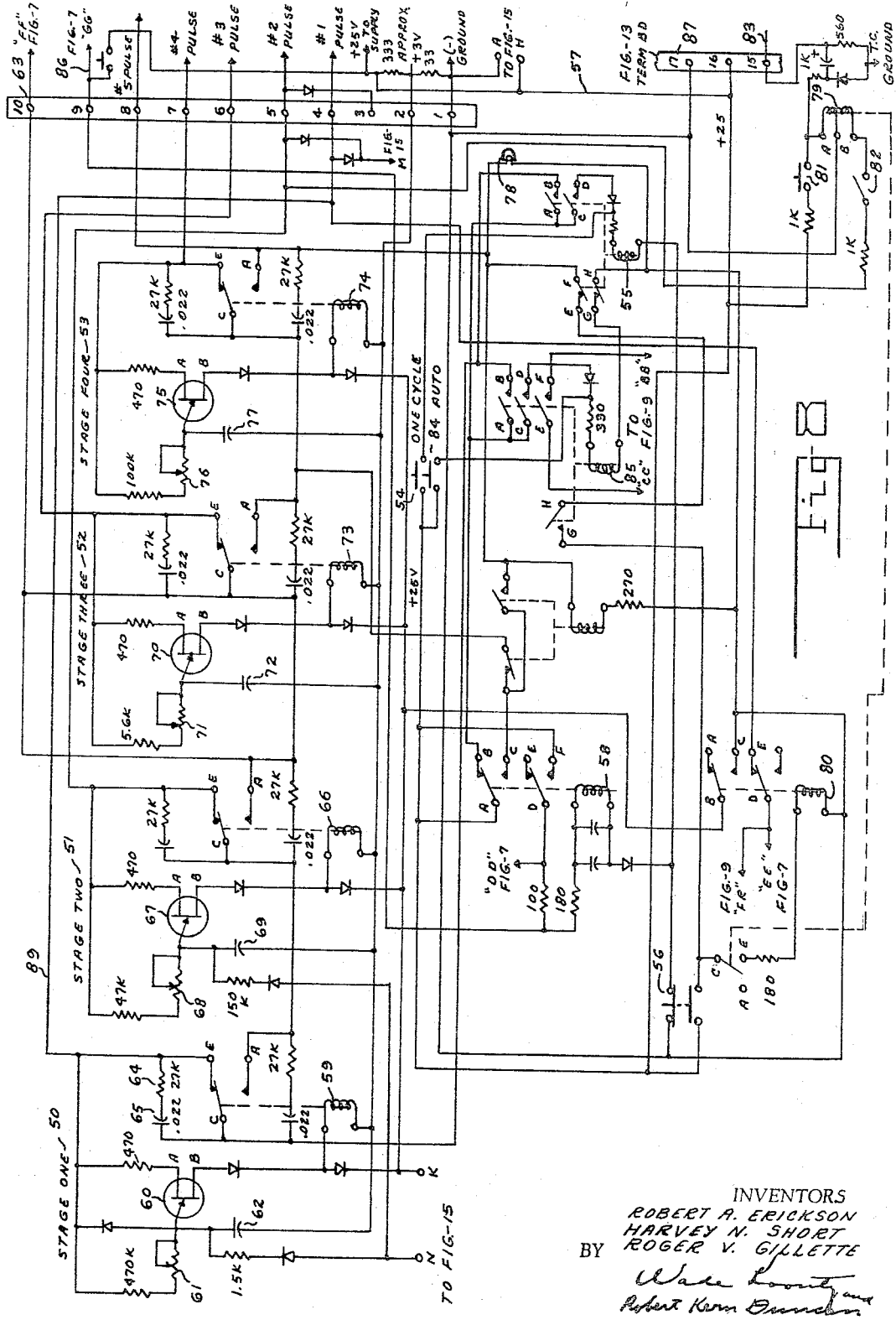

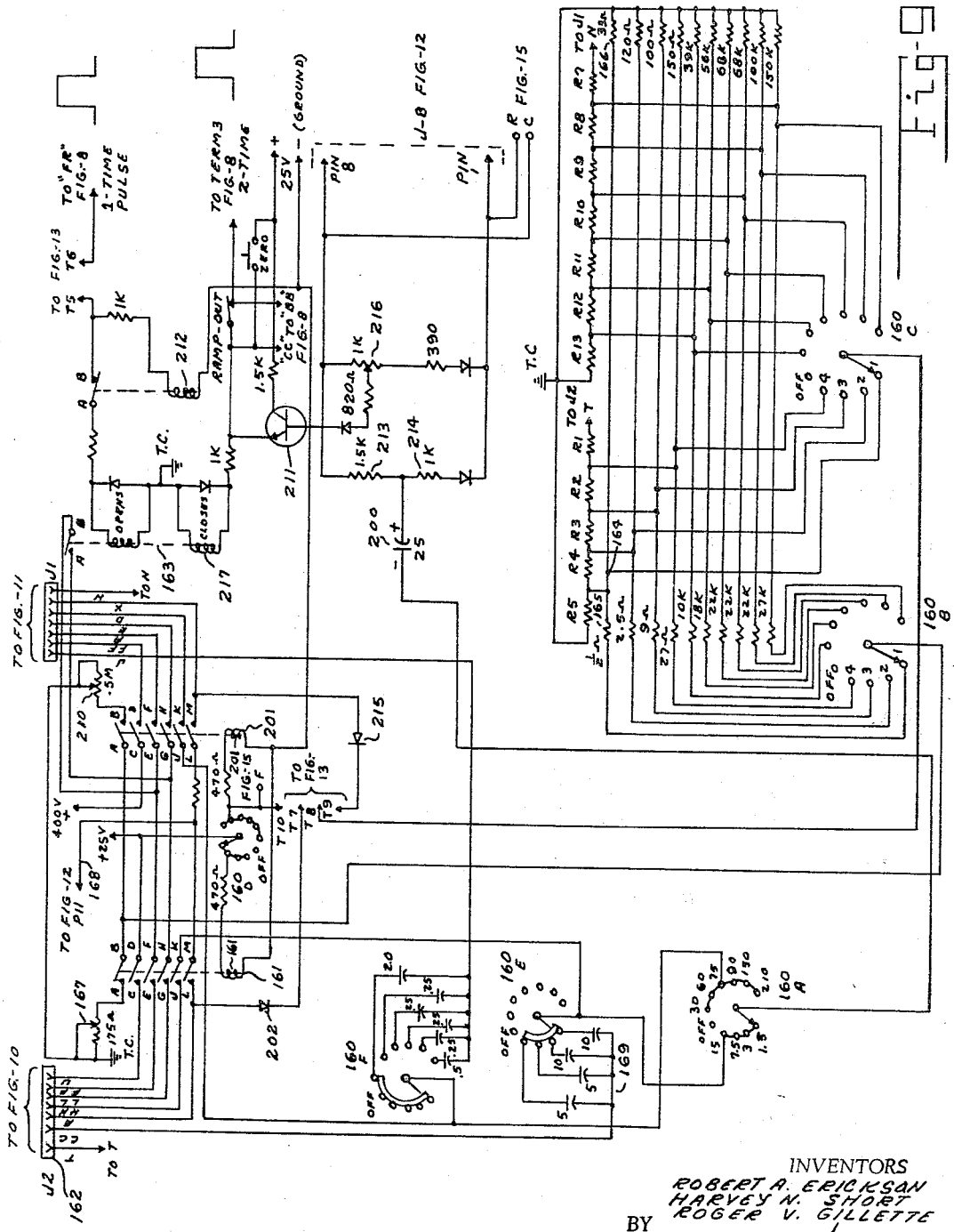

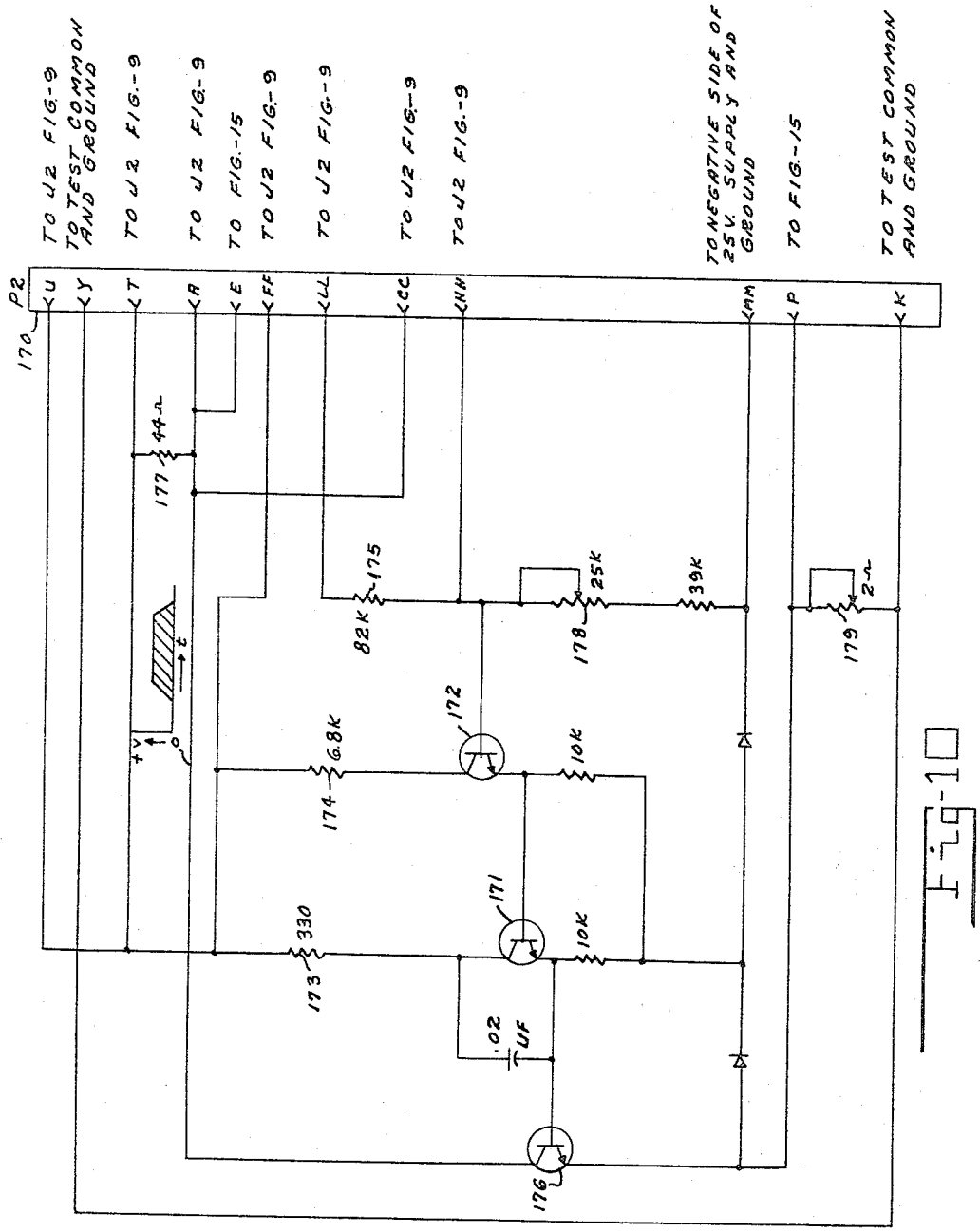

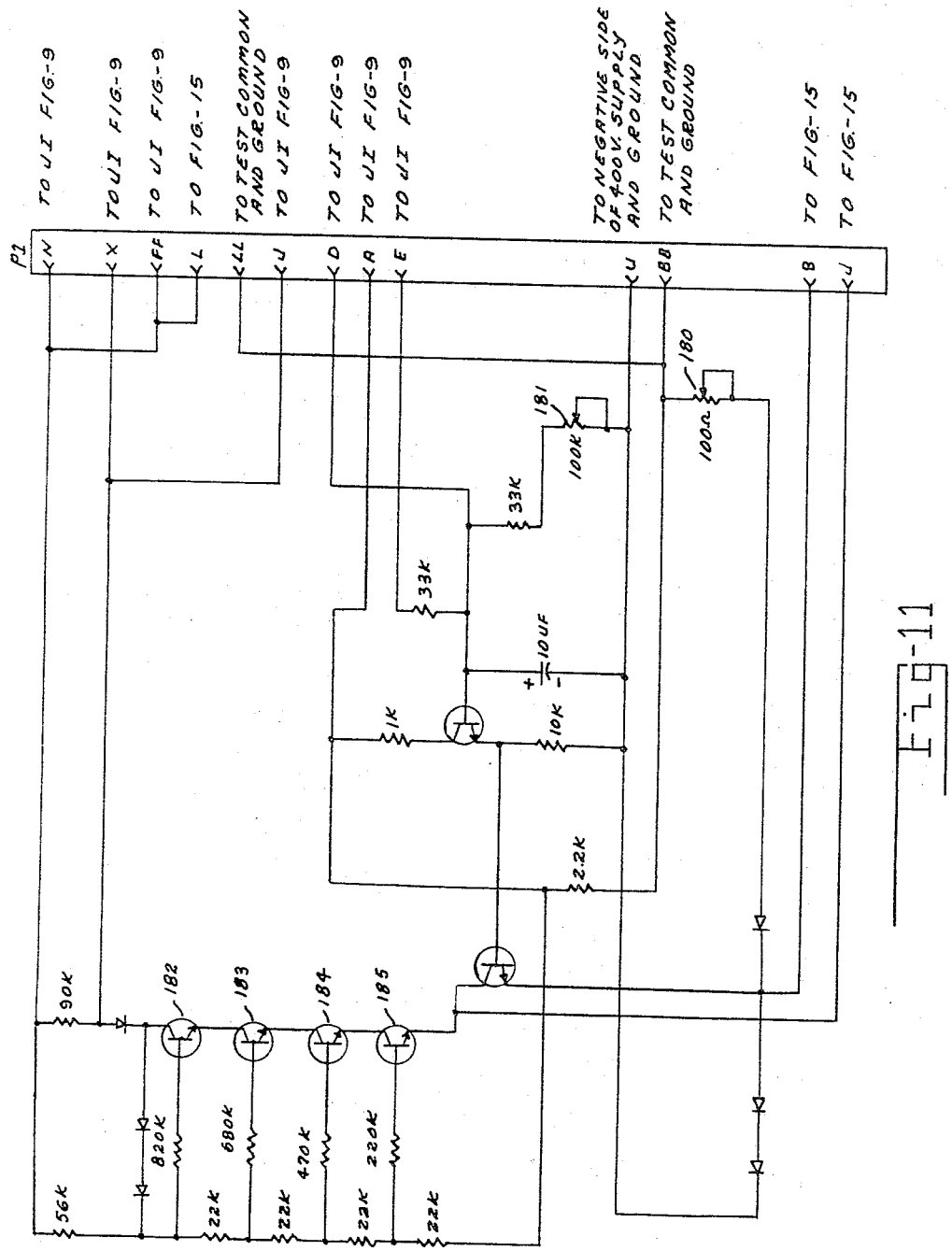

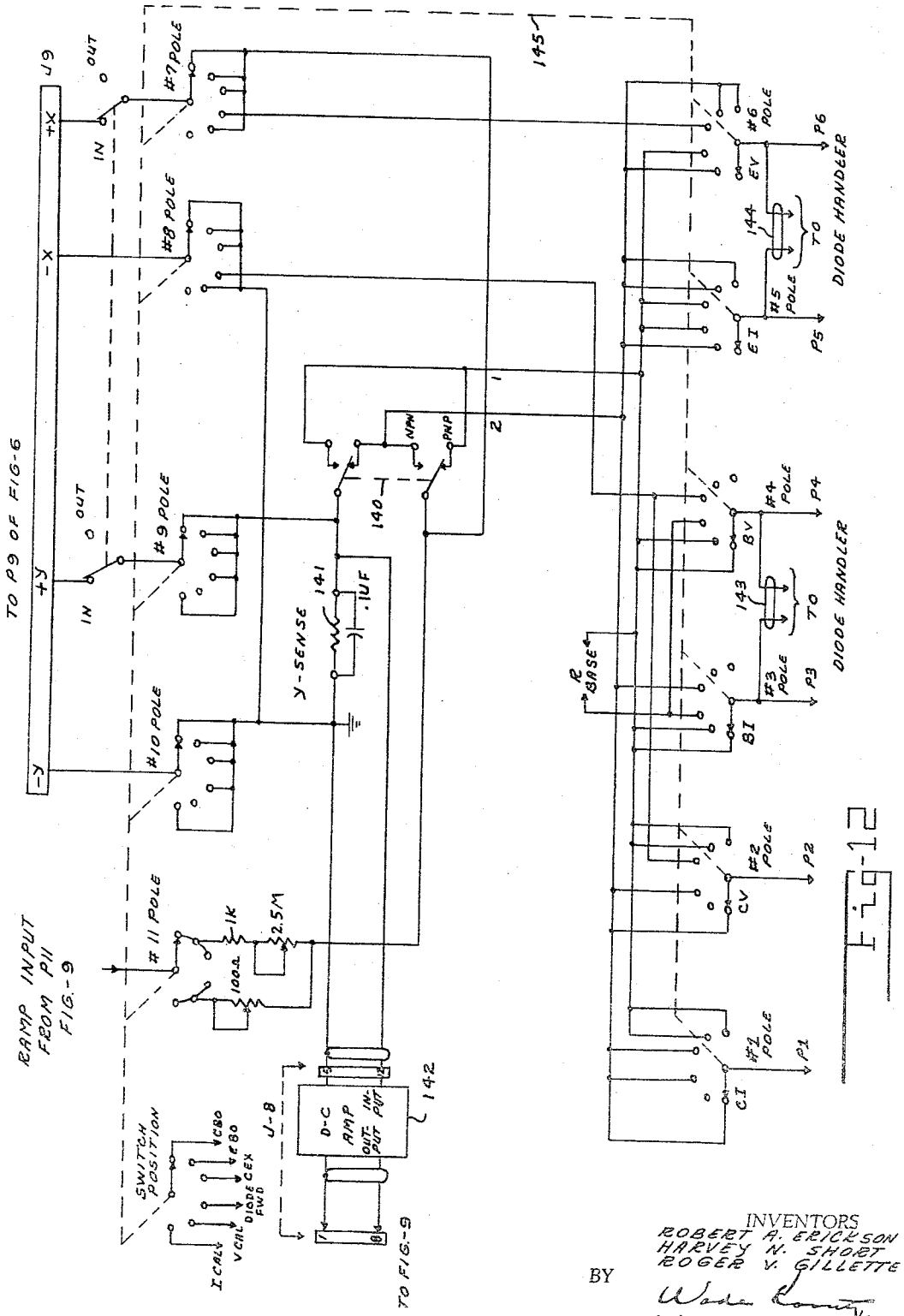

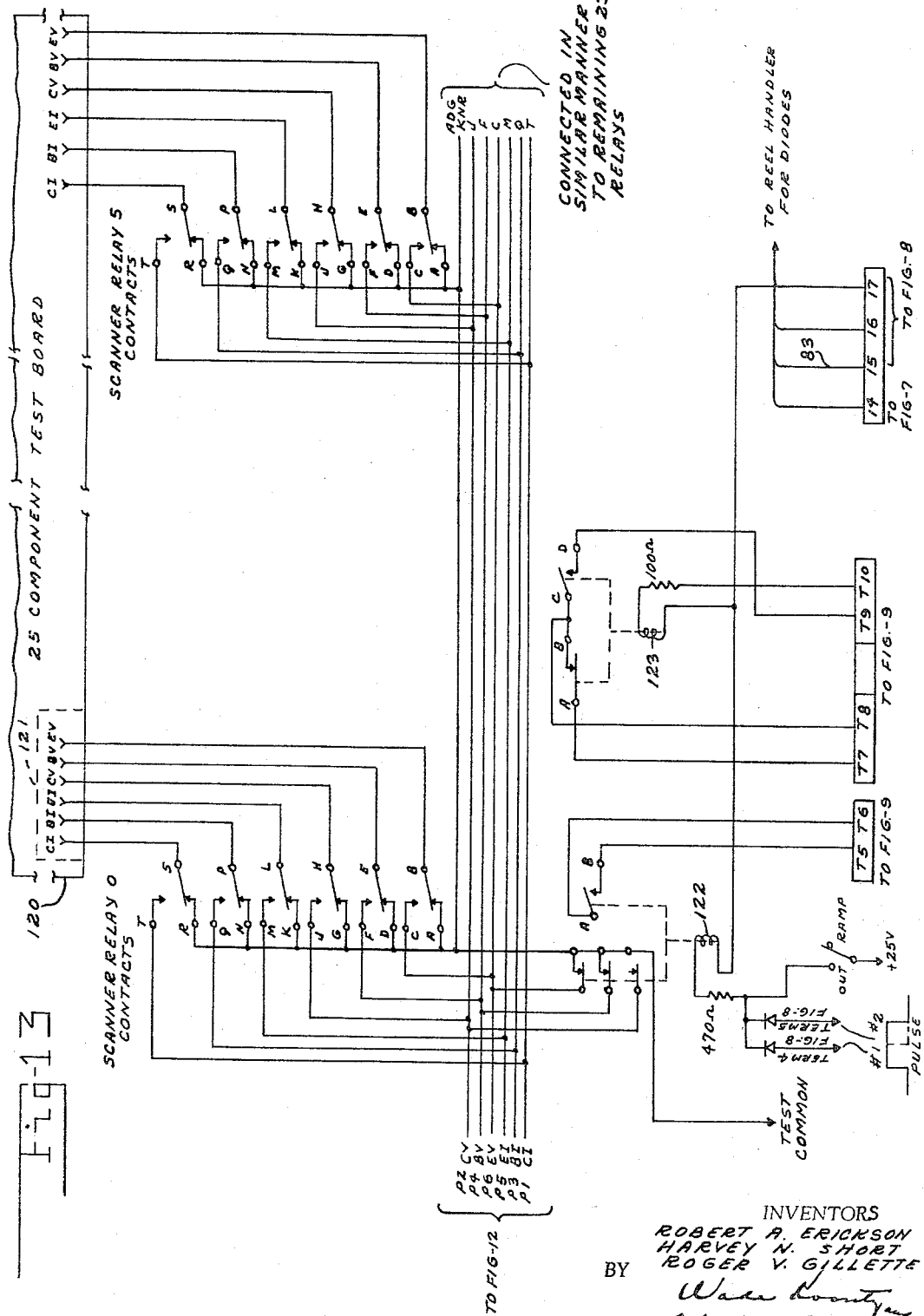

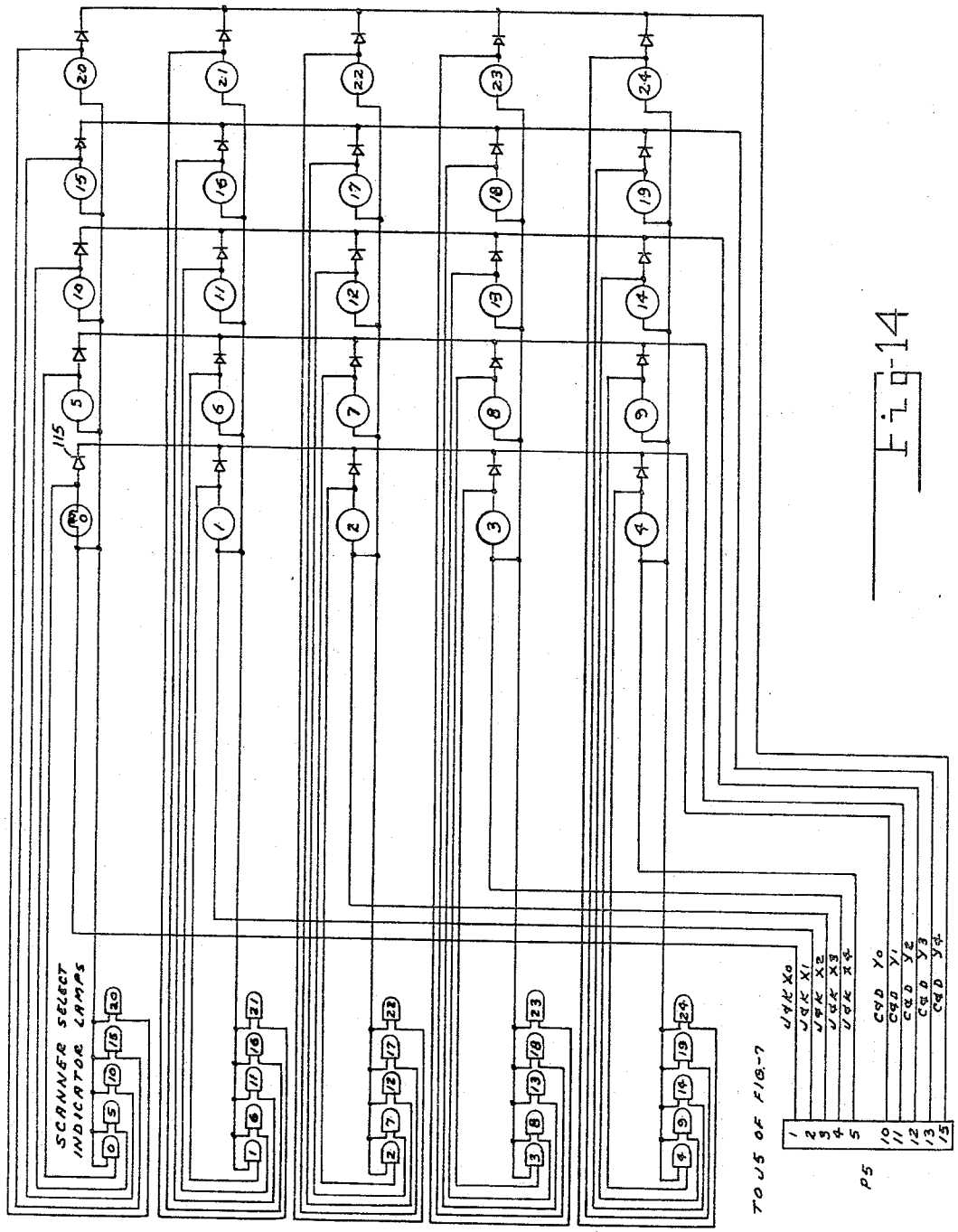

INVENTORS
ROBERT A. ERICKSON
HARVEY N. SHORT
ROGER V. GILLETTE
BY
ATTORNEYS

United States Patent Office 3,323,059
Patented May 30, 1967

3,323,059
AUTOMATIC TEST APPARATUS FOR DISPLAYING SEMICONDUCTOR DEVICE CHARACTERISTIC CURVES
Robert A. Erickson and Harvey N. Short, St. Paul, and Roger V. Gillette, Minneapolis, Minn., assignors, by mesne assignments, to the United States of America as represented by the Secretary of the Air Force
Filed Apr. 27, 1964, Ser. No. 363,030
6 Claims. (Cl. 324—158)

This invention relates to an automatic system that records and displays in X and Y coordinates the voltage-current characteristics of a plurality of electrical components. It is particularly advantageous for the expedient selection of components having a desired uniformity of electrical response characteristics. Automatic control of both current and voltage is provided and plots of the electrical characteristics of a group of components are presented on a single sheet of recording paper for ease of comparison. The system is adapted for use in conjunction with automatic component handling equipment such as the mechanical handlers for reeled diodes.

The system described is particularly suited for the rapid evaluation of the DC characteristics of a plurality of semiconductor diodes and transistors. The forward bias and the reverse bias characteristics of semiconductors including the breakdown characteristics of a group of Zener diodes can be displayed. This system will find great use in quality control in the production of electrical components. Similarly, in the inspection of purchased components the conformance with required specifications is rapidly determinable. In the case in which equipment being manufactured requires that matched components be used, but it is not economically feasible to demand that a quantity of the components meet a single rigorous specification, the apparatus herein disclosed enables one to expediently select those components with near identical characteristics from a group of components.

Advantages of the system herein disclosed over the prior art are many. Since the system is automatic the uniformity of the application of the testing potentials is assured resulting in truer appraisals of the characteristics possible than in the former manual processes and less need be placed on an operator's attentiveness, dexterity and uniformity. The disclosed system displays multiple plots on a single sheet of paper providing rapid and convenient comparison of characteristics rather than having a separate curve sheet for each component as with prior equipment. As contrasted to characteristic tracers employing a cathode-ray tube, this system provides a permanent written record of the characteristics. This system automatically obtains the characteristics much faster and obtains a greater quantity of plotted characteristics than can be realized in a given unit of time, compared to former manual measurements. The system is economical, yielding a cost per plot that is low compared to manual systems.

It is an object of the present invention to provide an automatic plotting system for recording the voltage-current characteristics of a plurality of electrical components.

Another object of the present invention is to provide an automatic indexing system for X-Y recorders so that a multiplicity of plots of electrical signal characteristics can be made on a single sheet of plotting paper.

Another object is to provide an automatic sequential control monitoring and plotting system that will control the application of test signals to a plurality of electrical components, monitor the electrical characteristics of the components independently during the application of the test voltages, and control the plotting of the individual component characteristics by an X-Y recorder.

Another object of the invention is to provide a new and improved automatic testing apparatus for determining and recording the characteristics of a plurality of electrical components in accord with generated test signals.

Further objects and additional advantages of the invention will become apparent from the following detailed description and drawings in which:

FIG. 6 is a schematic drawing of the mode switch and recorder input signals.

FIG. 7 is a schematic drawing of the relay ring counter.

FIG. 8 is a schematic drawing of the programmer.

FIG. 9 is a schematic drawing of the ramp generator control circuitry.

FIG. 10 is a schematic drawing of the low voltage ramp generator.

FIG. 11 is a schematic drawing of the high voltage ramp generator.

FIG. 12 is a schematic drawing of the parameter select switch.

FIG. 13 is a schematic drawing of the contact arrangement of a 25-position component scanner.

FIG. 14 is a schematic drawing of the actuating circuit for the 25-position component scanner.

Figure 1:
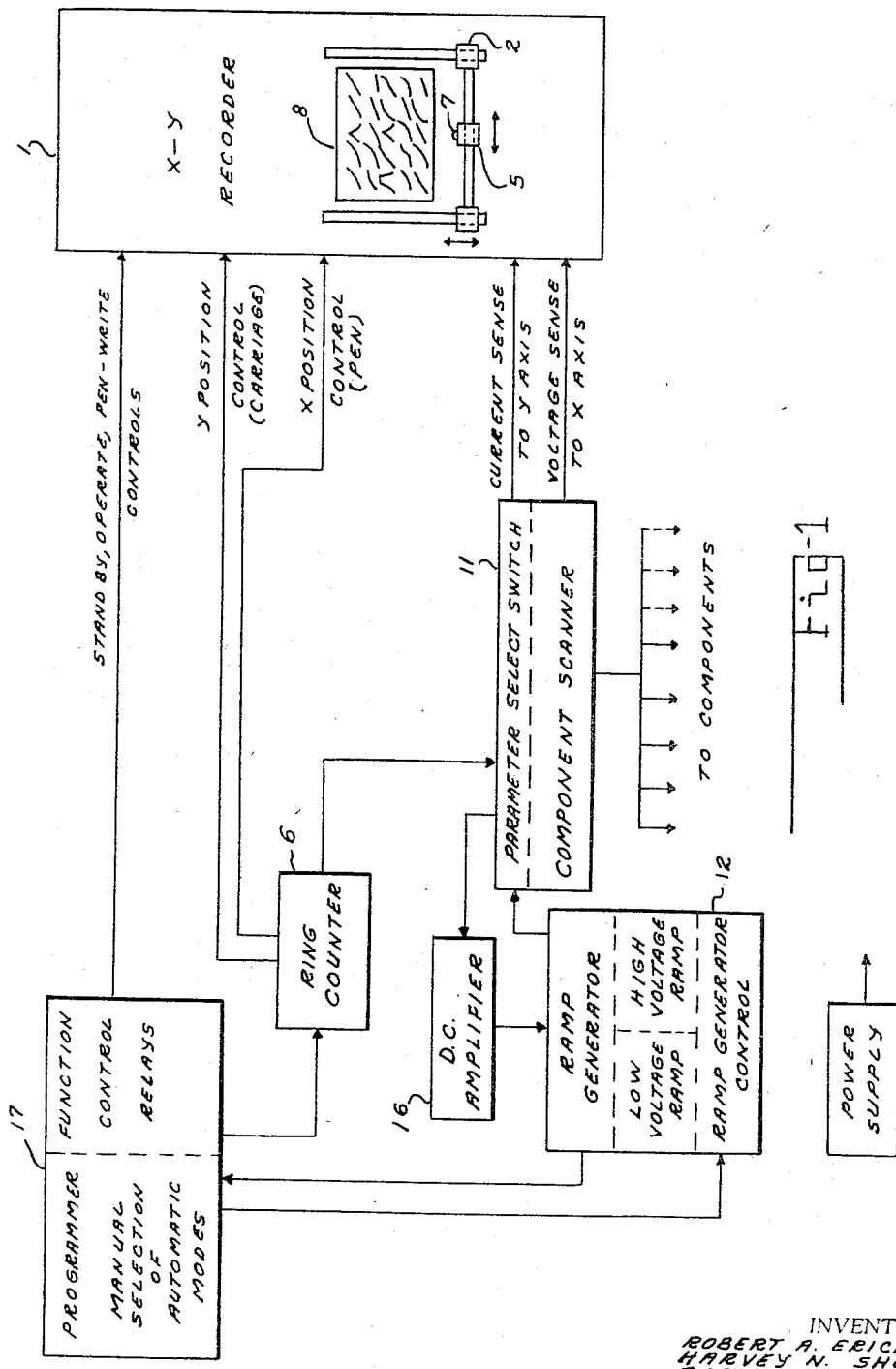
FIG. 1 is a block diagram showing the functional operation of the invention.

Referring more in detail to the drawings, FIG. 1 is a block diagram of the apparatus of the present invention. In the plotting of the characteristics of the components being tested the system performs three primary functions: one, to automatically position the writing pen at the proper starting position on the curve paper for each of the curves drawn; two, to control the application of the test voltage (or bias); and three, to select the component to be tested and automatically perform the required test.

An illustrative embodiment of this invention will be set forth and described in detail as the invention is applied to a system for testing and plotting the characteristics of a group of twenty-five components. The test voltages as described are of such values as to be particularly suited for the measurement of semiconductor devices.

Figure 5:
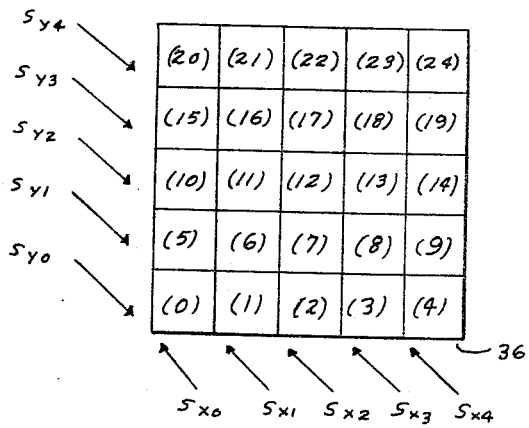
FIG. 5 is a drawing showing a typical division of the recording paper by an embodiment of the present invention.
Figure 4:
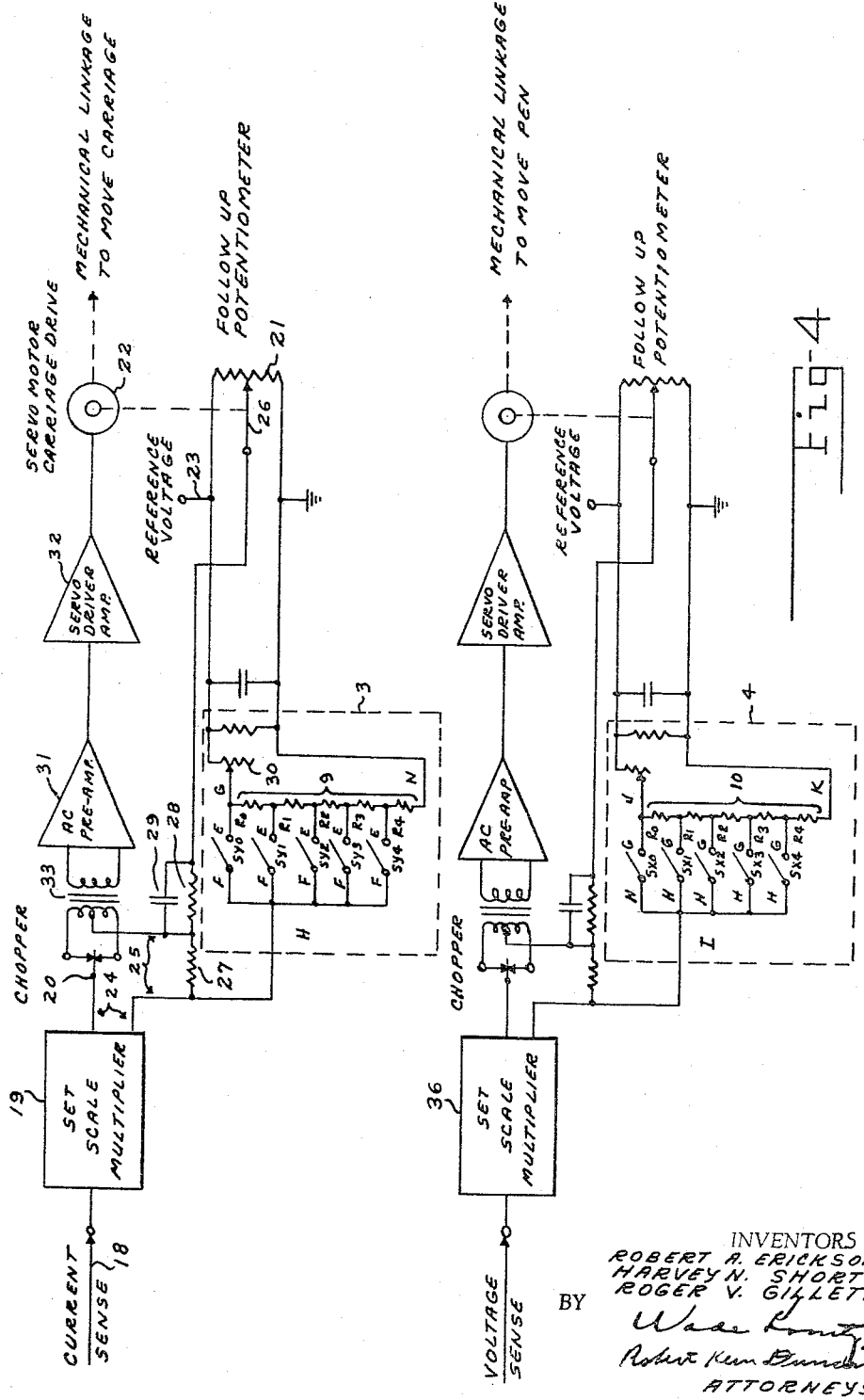
FIG. 4 is a block and partial schematic drawing of an X-Y recorder provided with multiple indexing means.

The X-Y recorder 1 may be a commercially available recorder modified as set forth herein or a unit constructed using the techniques disclosed. In an operating embodiment of this invention a commercially available X-Y recorder having a plotting area 8 of ten by fifteen inches, electrical control of the writing pen, and electrical control for positioning the writing pen was utilized. The continuously variable control for positioning the carriage 2 along the Y axis was replaced with the step positioning control 3, FIG. 4. Likewise, the positioning control for the pen slider 5, FIG. 1, was replaced with the step positioning control 4, FIG. 4. The switch contacts in the step positioning controls 3 and 4 of FIG. 4 are operated by the relay ring counter 6 shown in FIG. 1. These switches position the writing pen 7 to the twenty-five curve-origin positions by the resistive networks 9 and 10 of FIG. 4. The result of the action of these switches and the divider networks in dividing the plotting area into twenty-five individual plotting areas is shown in FIG. 5, the zero positions for each of the twenty-five individual plots being the indices represented by the intersections of the lines representing the stepped movements in the X and Y directions. The writing pen is positioned at the start of a particular curve according to the electrical operation of the switch and resistor networks 3 and 4 of FIG. 4, which are contained in the ring counter 6, FIG. 1. The line designations of FIG. 5 correspond to the switch designations in FIG. 4. For instance, if switches $S_{x2}$ and $S_{y2}$ are closed, the pen is at the intersection of their respective lines and ready to trace a curve in block twelve. The complete plot 8, FIG. 1, will contain the recorded twenty-five characteristics. The approximate value of the resistors for each axis may be obtained by dividing the total resistance required to sweep the writing pen through its maximum excursion along a respective axis by the number of plots desired along that axis. The final values of resistances should be determined empirically by adjusting the calculated value to provide the desired deflection. The operation of the recorder may be understood by considering in detail the action in only one of the coordinates since the action in both the X and Y coordinates are identical except for the mechanical aspect of the action in the X coordinate moving the writing pen horizontally along the carriage and the action in the Y coordinate moving the carriage (and the pen) in a vertical direction. Examining the operation in the Y coordinate: The vlotage between conductor 18 and ground (FIG. 4), taken from across the current sensing resistor contained in the parameter select switch section of the component scanner, represents the current flowing through the sensing resistor and the component being tested; it is applied to the Y axis circuits of the recorder. Set scale multiplier 19 attenuates or amplifies the input voltage so as to scale the magnitude of deflection to the desired amount compatible with the determined size of the individual plotting area. (In the embodiment being enumerated, 2 inches.) It also provides circuitry isolation. The signal voltage 24 from the set scale multiplier is applied as one of two voltages to a voltage comparator network comprising chopper 20 and input transformer 33. The chopper may be driven at a nominal 60 c.p.s. rate. The second voltage 25 applied to the comparator network is obtained from the degree of unbalance of the bridge network comprising the follow-up potentiometer 21, which is mechanically coupled to the carriage and servomotor 22, and the positioning network 3. The reference voltage source 23 is a fixed D.C. potential to energize the bridge circuit. Resistors 27 and 28 and capacitor 29 form a smoothing network to prevent instability and overshoot in the mechanical drive system. The chopper circuit compares these two voltages and develops an A.C. resultant error voltage having a magnitude and phase proportional to the relative amplitudes and polarities of the applied voltages. The A.C. error voltage is amplified and applied to the control winding of the servomotor 22. The servomotor moves the carriage (2, FIG. 1) and the slider 26 of the follow-up potentiometer 21 in the direction necessary to reduce the error voltage. Thereafter any change in the input signal will cause the carriage to move to a position corresponding to the magnitude of the change. If a varying input signal is applied through conductor 18, and ground, the carriage will follow the variations. Variable resistor 30 is used to position the pen, through movement of the carriage, to the initial Y origin position (switch $Y_{y0}$ closed and no input signal), represented by line 33 (FIG. 5), of the lower set of curve plotting areas. The X channel is similar in operation. The amplifier system 31 and 32 may be a conventional servo preamplifier and driver amplifier. Ideally they should have high gains and relative narrow band widths; the pass band being approximately centered around the chopper frequency. This provides high accuracy and good noise rejection.

Ring counter 6, FIG. 1, in addition to positioning the recording pen to the twenty-five zero positions, also provides the actuating control for the twenty-five position component scanner 11. The ring counter 6 consists of two five-relay ring counters with one ring gated by the other for a count by five to a total of twenty-five. It receives time sequencing pulses from the programmer 17.

Component scanner 11 has twenty-five, six-pole, double-throw, relays that successively select in a sequential manner components to be tested on command from the counter. The component under test is connected to the test circuit through the normally open relay contacts. The normally closed switch contacts of each of the scanner relays provide a short circuit to ground for the components not under test. A relay connected to the test circuit shorts the test points when the scanner is switching from one component to another.

In the particular operating embodiment being set forth the ramp generator 12, FIG. 1, contains two generating circuits. A low voltage ramp generator producing ramps having maximum voltages of 1.5, 3, 7.5 and 15 volts with approximately 400 milliamperes of current available. Such a generator is set forth in detail in FIG. 10; and a high voltage ramp generator supplying ramps of 30, 60, 75, 90, 150 and 210 volts with approximately 2 milliamperes of current available, as shown in detail in FIG. 11. An overall ramp voltage adjustment is provided for each generator. It affects the maximum voltage level of all the ramps in the generator. Potentiometer 167, FIG. 9, is the adjustment for the low voltage generator and potentiometer 210 (FIG. 9) is the adjustment for the high voltage generator. Potentiometers 179, FIG. 10, and 180, FIG. 11, provide an adjustment to balance out any steady-state offset voltage present at the respective outputs. The ramp voltages are produced by transistorized amplifiers using capacitive feedback. Potentiometers 178, FIG. 10, and 181, FIG. 11, provide adjustments of the slopes of the ramps.

Figure 2:
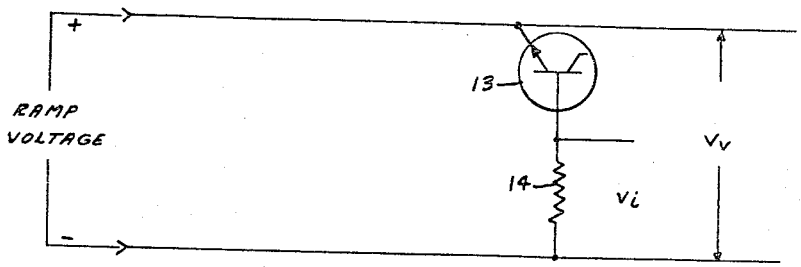
FIG. 2 is a schematic drawing showing the use of the apparatus in the electrical measurement of the reverse diode characteristic of the emitter base junction of a transistor.
Figure 3:
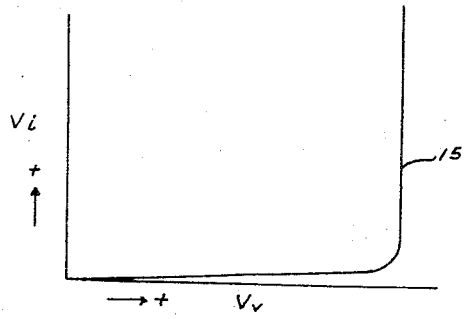
FIG. 3 is the drawing of a typical plot of the electrical measurement of the reverse characteristic, EBO, of a transistor showing the reverse breakdown characteristic.

To control the test current D.C. amplifier 16 of FIG. 1 (and 142 of FIG. 12) is used. Its voltage input is taken from across the current sensing resistor 141 (FIG. 12). When the voltage across this resistor, which is a measure of the current flowing through it, corresponds to a 2-inch deflection in the Y axis of the plotter the gain of the D.C. amplifier is set such that its output on pins 8 and 1 of J–8, which is the input to the circuitry of transistor 211 (FIG. 9), is sufficient to cause the actuation of relay 163 (FIG. 9) which causes the slope of the test voltage to be reversed. The ohmic value of the current sensing resistor is determined by considering the purported voltage-current characteristics of the components to be tested, and the sensitivity of the Y axis recording channel. For instance, to test diodes having a rated maximum forward current capability of two milliamperes, and that is the desired maximum amount of current to be established by the test, and the amount of voltage required at the input of the Y channel to produce the maximum amount of deflection per plot (two inches in this instance), is two volts, then the ohmic value of the current sensing resistor to be used is one-thousand ohms. It should be pointed out that the gain in the X channel of the curve recorder is adjusted by the set scale multiplier 36 so that the maximum ramp test voltage will produce the maximum X deflection desired per plot. Resistors 213 and 214 also across the output of the D.C. amplifier provide through capacitor 209 a degenerative feedback voltage to the ramp generator. The effect of this feedback is to decrease the rate of change of the ramp voltage. In the case where the current through a component under test does not reach the set maximum test current, the ramp slope is reversed by a timing pulse from the programmer. The time of rise and fall of the ramp voltage remains nearly the same on all ranges. (In the embodiment set forth in detail it is approximately two seconds for each.) The test voltage is applied to the component under test in series with the current sensing resistor. For diode characteristic plots the horizontal (voltage) axis is sensed across the series combination to obtain the reverse voltage characteristics and directly across the diode for obtaining the forward voltage characteristics. The vertical (current) axis is sensed across the current sensing resistor. FIG. 2 shows the connections for obtaining the reverse emitter-base characteristics of transistor 13. The voltage developed across current sensing resistor 14 is a function of the current flowing through the transistor, and is used to actuate the recording pen in the Y direction by movement of the carriage. FIG. 3 shows a typical plot 15 of the breakdown characteristic obtained from the circuit of FIG. 2. Voltage $V_v$ from the ramp generator increased uniformly with time.

The programmer 17, FIG. 1, and detailed in FIG. 8, contains four adjustable delay stages using unijunction transistors. It provides the necessary command signals for the operation of the system. It may be operated in a one-cycle mode or it can be operated to automatically reset at the end of each cycle until a definite number of components have been plotted or until all twenty-five components have been plotted.

Figure 15:
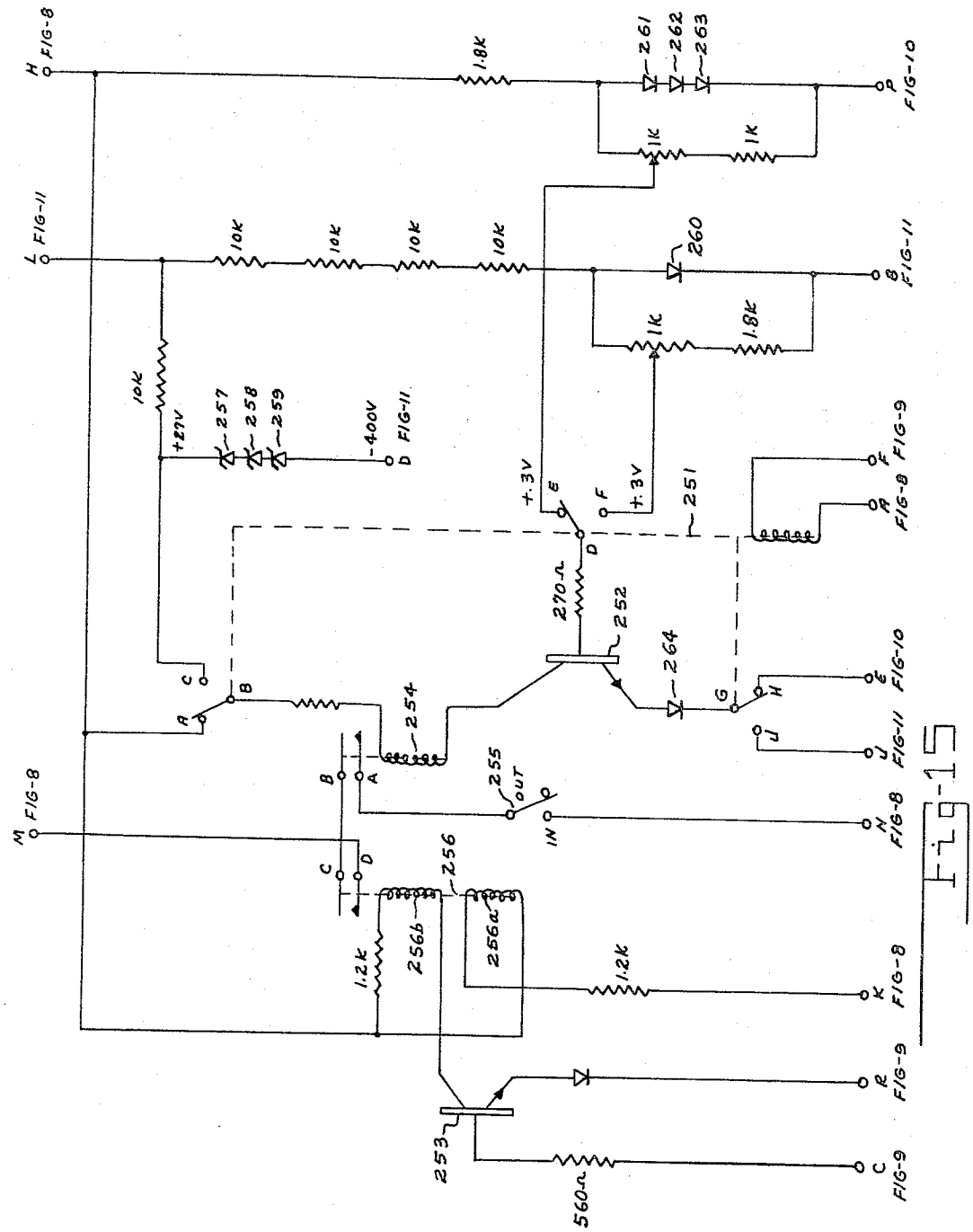
FIG. 15 is a schematic drawing of the automatic cycle speed-up circuit.

The plotting system will first be explained in detail without reference to the automatic cycle speed-up circuitry (FIG. 15). Then the operation of the speed-up circuit will be incorporated into the overall operation. The operation of the system without the speed-up circuit requires approximately 7.2 seconds for the test (one cycle) of each component. The division of time during each cycle is approximately as follows: Consider the initiation of the number one pulse as time zero at which the writing pen is dropped on the chart paper, the short removed from the test circuit, and the ramp generator commences the build-up of the ramp voltage. The test voltage then builds up until either the number two pulse from the programmer occurs which terminates the build-up and reverses the slope of the test voltages starting the decreasing ramp, or the ramp slope is reversed by the current sensing circuitry when the current exceeds the predetermined value. The number two pulse from the programmer occurs approximately three seconds after the number one pulse. It will reverse the slope of the tesh voltage if that has not been previously done by the circuit operated by sensing the test current. The time interval allowed for the decreasing slope ramp voltage by the programmer is also approximately three seconds and is terminated by the number three pulse. The number three pulse causes the writing pen to be lifted from the chart and the test circuit to be shorted to ground. The duration of the time interval between the number three pulse and the number four pulse may be made approximately fifty milliseconds. The number four pulse advances the counter one count which also advances the component scanner one position. The time interval between the number four pulse and the number five pulse may be made slightly less than a second. The number five pulse stops the cycle and resets the programmer to zero time.

The system may best be further understood by examining in greater detail the sequence of operation.

Referring to the programmer, FIG. 8, four adjustable delay stages 50, 51, 52 and 53 provide the necessary timing pulses to operate the plotter, the function relays, the ramp generator, and the ring counter. To initiate one cycle of operation the one-cycle push button 54 is momentarily depressed. With the one cycle push button 54 momentarily depressed a positive potential (+25 volts) is applied across the windings of the one cycle relay 55, through the normally closed contacts of the function switch 56 to ground. Said relay will be energized, i.e., "pulled" and is held by the +25 volt supply from line 57, flowing through the normally closed contacts A and B of the stop point relay 58, contacts C and D of the pulled one cycle relay 55 and through the normally closed contacts of the function switch 56 to ground. With the one cycle relay 55 held, the +25 volts will be available, via the normally closed contacts A and B of the stop point relay 58, contacts A and B of the one cycle relay 55, and the normally closed contacts C and E of the stage one relay 59 to base A of unijunction transistor 60 and the RC network comprising variable resistor 61 and capacitor 62. Simultaneously, this voltage is also applied by conductor 89 to pin four of the pulse distributor board 63 where it is distributed throughout the system as timing pulse number 1. The duration of this pulse is determined by the time interval required to charge capacitor 62 to the voltage, at which the unijunction transistor 60 fires. The resultant increase in current through base B of transistor 60, and the winding of the stage one relay 59 will cause said relay to pull; as the relay pulls the normally made contacts C and E are broken, turning off transistor 60 and removing the 1-time pulse from the pulse distributor board 63. The RC network comprising resistor 64 and capacitor 65 is used as an arc suppressor and also serves to damp out oscillations caused by contact bounce. With the bistable stage one relay 59 pulsed in the C to A contact position, the +25 volts is available, via the normally closed contacts C and E of the stage two relay 66 to base A of unijunction transistor 67 and the delay network containing variable resistor 68 and capacitor 69. Simultaneously, the voltage is also applied to pin five of the pulse distributor board 63 where it is distributed throughout the system as timing pulse number two. When capacitor 69 becomes sufficiently charged, unijunction transistor 67 will fire, causing the stage two relay 66 to pull. With said relay pulled contacts C and E break, terminating timing pulse number 2 and turning off transistor 67. The +25 volts is now available to base A of unijunction transistor 70 and the delay network containing variable resistor 71 and capacitor 72 via contacts C and E of the stage three relay 73 and contacts C and A of the pulsed stage one and stage two relays 59 and 66. Simultaneously, the voltage is also available at pin six of the pulse distributor board 63 where it is distributed throughout the system as timing pulse number three. Subsequently capacitor 72 is charged to the firing voltage of transistor 70. With transistor 70 fired, the stage three relay 73 will pull, breaking contacts C and E, terminating timing pulse 3 and turning transistor 70 off. The +25 volts is now available via contacts C and A of the pulsed stage one, two and three relays 59, 66 and 73 and the made contacts C and E of the stage four relay 74 to base A of unijunction transistor 75 and the delay network containing variable resistor 76 and capacitor 77. Simultaneously it is applied to pin 7 of the pulse distributor board 63 where it is distributed throughout the system as timing pulse number four. After the predetermined delay interval, capacitor 77 will be charged to the voltage causing transistor 75 to fire. The resultant surge in current through the windings of the stage four relay 74 will cause said relay to pull, breaking contacts C and E which in turn terminate timing pulse number 4 and turn transistor 75 off. The +25 volts (now referred to as timing pulse number five) is routed through the made contacts C and A of the pulled stage four relay 74, to pin 8 of distribution board 63 and through the end of cycle indicator 78 to ground. One timing cycle has been completed and the operation will stop. Before initiating a second one cycle mode of operation, the function push button 56 must be momentarily depressed and contacts C and E of the interlock relay 79 made by depressing reset push button 81. This action causes the function relay 80 to pull, and removes the ground from the one cycle relay 55, causing said relay to drop, opening contacts AB and CD, and closing EF and GH. The +25 volts from the 25 volt supply, due to the opening of the normally open contacts A and B of the one cycle relay 55, is now removed from the four pulse forming stages 50, 51, 52 and 53. Simultaneously, as the function relay 80 is momentarily pulled, the normally open contacts B and C of the said relay are made, supplying a reset (ground) pulse to all the stage relays. A second timing cycle can now be initiated.

Prior to discussing the automatic mode of operation, a brief description of the interlock relay circuitry (lower right corner of FIG. 8) will be given as it relates to the programmer. When plotting the characteristics of semiconductor elements located on a 25 component test board, the reset switch 81 must be depressed providing +25 volts through winding A of the interlock relay 79 to ground. The bistable interlock relay 79 will be pulled, closing the normally open contacts C and E. At the termination of a plotting cycle, the function relay 80, via the made interlock relay contacts C and E, will be pulled supplying a reset (ground) pulse via its made contacts B and C to the stage relays 59, 66, 73 and 74. When plotting the characteristics of semiconductor elements (diodes) located on a reel handler, the interlock relay switch 82 must be in the closed position. A microswitch located on the reel handler will initiate a pulse each time the handler is advanced one position, locating a new component in the test circuit. Said pulse is applied via pin 15 of the interlock circuit board 87, through winding A of interlock relay 79 to ground. The relay is pulled, making contacts C and E. The relay is pulsed to the alternate operating state by timing pulse number 2, which is applied via the closed interlock switch 82 through winding B of the interlock relay 79 to ground. Contacts C and A are now made and contacts C and E are open. Assuming the use of the reel handler, the sequence of events during a plotting cycle is as follows: at the initiation of timing pulse number two, the interlock relay 79 is pulsed via winding B, making contacts C and A. Subsequently (during 4 time) the reel handler will be advanced one position, causing the microswitch to initiate a pulse to winding A of the interlock relay 79. Said relay will now be pulled to the alternate operating state, making contacts C and E. At the termination of the plotting cycle (5 time) the function relay 80 is pulled, via contacts C and E of the interlock relay 79, resetting the programmer to zero time. This alternate pulsing of the interlock relay 79 ensures that the diode reel handler is sequentially positioning a new component into the test circuit during each timing cycle. If a malfunction occurred, i.e., the reel handler did not advance, no pulse on conductor 83 from the microswitch on the reel handler would be available to pull the interlock relay 79; contacts C and E would remain open. Accordingly, at the termination of the timing cycle, the function relay 80 could not be pulled and the stage relays 59, 66, 73 and 74 could not be reset. The machine would stop. It is to be observed that when the disclosed system is used in cooperation with a reel handler, such as is used to provide testing connections to reeled electrical components such as diodes, resistors, capacitors, and similar pieces of electrical and electronic equipment, the interconnections between the reel handler and the disclosed automatic plotting system comprise: the test voltage supplied to, and the resultant test signal received from the handler through cables 143 and 144 connecting to poles numbers 3, 4, 5 and 6 of parameter select switch 145 (FIG. 12); the time four command pulse from the programmer through switch 105; FIG. 7, to terminal 14 of FIG. 13, which triggers the component advance mechanism in the handler; and the signal from the handler (microswitch) on line 83 to terminal 15 of FIG. 8 indicating that the component to be tested has been advanced and is under the test head. This signal may be a pulse of the +25 volts supplied to the handler through terminal 16, FIG. 13.

The programmer is also capable of automatically recycling itself at the termination of a timing cycle. The automatic mode of operation is as follows. With the auto push-button switch 84 momentarily depressed, the +25 volts creates a current flow through the momentarily closed switch contacts of said push button 84, the winding of the auto relay 85, the normally closed contacts G and H of the one cycle relay 55 to ground. The relay 85 will be pulled, and held by the current flow from the +25 volt supply, through the normally closed contacts A and B of the stop point relay 58, contacts C and D of the pulled auto relay 85, the normally closed contacts G and H of the one cycle relay 55 to ground. With the auto relay 85 held, +25 volts is available through the normally closed contacts A and B of the stop point relay 58, contacts A and B of the auto relay 85 to stage one, 50, of the pulse forming circuitry. The subsequent generation of timing pulses in the automatic mode of operation is the same as previously described for the one cycle mode, however, with the following additional feature. As the stage four relay 74 is pulled to terminate timing pulse number 4, a +25 volts (timing pulse number 5) is applied through contacts C and A of the pulsed stage four relay 74, the normally closed contacts E and F of the one cycle relay 55, contacts G and H of the pulled auto relay 85, contacts C and E of the interlock relay 79 through the windings of the function relay 80 to ground. The function relay 80 will be pulled, making the normally open contacts B and C which in turn supplies a reset (ground) pulse simultaneously to all the bipolar stage relays 59, 66, 73 and 74. Concurrently, as the stage four relay 74 is reset, the +25 volt supply is removed from the function relay 80, causing said relay to drop. During this resetting interval, the auto relay 85 remains pulled so that the +25 volts is immediately available to stage one, 50, of the pulse forming circuitry. The above described timing cycle is repeated until such time as a pulse is initiated on the stop point line 86 (pin 9 on the pulse distributor board 63) indicating that the last selected component has been tested. Said pulse will pull the stop point relay 58, breaking the normally made contacts A and B, which in turn will open the +25 volts path to the pulse generating circuitry. The machine will stop. The timing cycle of the programmer may be diagrammed as follows:

No. 1 pulse 0 sec.:
    drop pen
    remove short from test circuit
    apply test bias
No. 2 pulse 2.5 sec.:
    reverse test bias
No. 3 pulse 5.0 sec.:
    lift pen
    apply short to test circuit
No. 4 pulse 5.0 sec.: .
    advance counter
    advance component scanner
No. 5 pulse 6.0 sec.:
    (1) stop cycle or
    (2) reset programmer to zero time The curve recorder pen positioning and component selection function is performed by the integrated operation of the ring counter and the 25 position scanner. The ring counter, FIG. 7, employs ten six-pole single-throw relays. Two normally open contacts CD and EF in the X ring and GS and JK in the Y ring, and one normally closed contact, AB in the X ring and LM in the Y ring, perform the count function. The counter has two rings of five relays each. One ring is associated with the X axis and the other with the Y axis of the recorder. The Y ring is gated by the X ring so that for five counts on the X, the Y counts once. The switches SY (0–4) and SX (0–4) (refer to FIG. 4 and FIG. 5) are on the count relays (GH on the X ring and EF on the Y ring) of FIG. 7 so that the 25 individual zero positions of the pen are determined by the operation of the counter. Another contact on each relay (LM on the X ring and AB on the Y ring) is used to stop the system after a predetermined number of operations. The last set of contacts, JK on the X ring and CD on the Y ring, are used to control the 25 position scanner. The count operation is performed by the apparatus shown in FIG. 7 as follows: The home base push button 100 is momentarily depressed, making contacts A and C, which in turn provide a path for the +25 volts, via the windings of the home base relay 101 to ground. As the home base relay is momentarily pulled, the +25 volts from conductor 102 causes current to flow via the made contacts F and G, through winding 103 of the $Y_0$ relay, the normally closed contacts L and M of the $Y_1$ relay to ground pulling the $Y_0$ relay. Said relay is held via the +25 volts applied through the normally closed contacts A and B of the home base push button, the made contacts J and K of pulled $Y_0$, the relay winding 103 of said relay, the normally closed contacts L and M of the $Y_1$ relay, to ground. Concurrently, as the $Y_0$ relay is pulled, +25 volts is supplied via the momentarily made contacts D and E of the home base relay, across winding 104 of the $X_0$ relay, the normally closed contacts A and B of the $X_1$ relay to ground-pulling relay $X_0$. Said relay is held via the +25 volts applied across the normally closed contacts A and B of the home base push button 100, the made contacts C and D of the pulled $X_0$ relay, through the winding 104 of said relay, across the normally closed contacts A and B of the $X_1$ relay, to ground. Prior to the initiation of the timing cycle, assuming the home base button was depressed, relays $X_0$ and $Y_0$ are pulled. At time four of the first plotting cycle (as initiated by the number four pulse from the programmer, FIG. 8), that pulse from the programmer is applied through the closed contacts of the counter switch 105, and the winding 106 of the pulsing relay 113, to ground. Concurrently, as the pulsing relay 113 is being pulled, the pulse is momentarily applied through the normally closed contacts A and B of said relay, contacts E and F of the pulled $X_0$ relay, across winding 107 of the $X_1$ relay, the normally closed contacts A and B of the $X_2$ relay, to ground. $X_1$ is now pulled and will remain held by the +25 volt supply, through normally closed contacts A and B of the home base push button 100, the made contacts C and D and the winding 107 of the pulled $X_1$ relay, across the normally closed contacts A and B of $X_2$, to ground. As relay $X_1$ is pulled, contacts A and B of said relay break, removing the ground path to $X_0$. Relay $X_0$ is dropped. During subsequent time 4 pulses from the programmer, relays $X_2$, $X_3$, and $X_4$ will be sequentially pulled and their preceding relays sequentially dropped in the manner previously described. At time 4 of the fifth timing cycle, relay $X_0$ will be pulled by the current flow through contacts A and B of the pulsing relay 113, the made contacts E and F of the held $X_4$ relay, winding 104 of the $X_0$ relay, the normally closed contacts A and B of the $X_1$ relay to ground. Concurrently, the number 4-timing pulse also pulls relay $Y_1$ via current flow through contacts C and D of the pulsing relay 113, the made contacts L and M of the $X_4$ relay, the made contacts G and H of the $Y_0$ relay, winding 108 of the $Y_1$ relay, the closed L and M contacts of the $Y_2$ relay, to ground. While $X_0$ is being held via its made contacts C and D to the +25 volt supply, contacts A and B will be separated, opening the ground path for relay $X_4$, causing said $X_4$ relay to drop. Similarly, as relay $Y_1$ is held via its made contacts J and K to the +25 volt supply, contacts L and M will break opening the ground path to relay $Y_0$, causing said $Y_0$ relay to drop. Because the Y ring is gated by the X ring, the X ring relays must be sequentially pulled before the next Y relay ($Y_2$) is pulled. The above described count sequence continues, i.e. five counts of the X for one count on Y, until such time as the 25th 4-time pulse is to be applied. The condition of the counter prior to the initiation of said pulse is as follows: relay $X_4$ is held by the +25 volts supplied through contacts A and B of the home base push button, the made contacts of the pulled $X_4$ relay, and the normally closed contacts A and B of the $X_0$ relay, to ground. Relay $Y_4$ is held via the +25 volts supplied through contacts A and B of the home base push button, the made contacts J and K of the $Y_4$ relay, the normally closed contacts L and M of the $Y_0$ relay to ground. At 4-time of the 25th plotting cycle, the pulse from the programmer is applied through contacts C and D of the pulsing relay 113, the made contacts L and M of the $X_4$ relay, the closed contacts of the stop point switches 109 and 110 (the contacts are shown set for 25 plots), the made contacts A and B of the $Y_4$ relay, and through line 86 across the winding 58 of the stop point relay (FIG. 8) to ground. The stop point relay is pulled, opening its normally closed contacts A and B which in turn opens the +25 volt path to the pulse forming delay stages. In retrospect, the 25th 4-time pulse is also applied through contacts A and B of the pulsing relay 113, contacts E and F of the held $X_4$ relay, winding 104 of the $X_0$ relay, the normally closed contacts A and B of the $X_1$ relay to ground, pulling $X_0$. As relay $X_0$ pulls, contacts A and B break, causing relay $X_4$ to drop. Concurrently, the 4-time pulse is applied through contacts C and D of the pulsing relay, contacts L and M of the held $X_4$ relay, contacts G and H of the $Y_4$ relay, across winding 103 of the $Y_0$ relay, contacts L and M of the $Y_1$ relay to ground. Relay $Y_0$ is pulled, breaking contacts L and M, which in turn cause relay $Y_4$ to drop. The machine is stopped; the counter is recycled to the zero, i.e. home base, position. The X-step and Y-step push buttons 111 and 112 provide a manual means of stepping the counter. The stop point switches 109 and 110 enable the operator to manually select a test count less than the maximum 25 units.

That portion of the counter circuitry which controls the pen position is symbolically illustrated in FIG. 4. The switches $S_{y0}$ to $S_{y4}$ correspond to the switch contacts E and F on the Y ring relays $Y_0$ to $Y_4$. Likewise the switch contacts G and H on the X ring relays are represented by $S_{x0}$ to $S_{x4}$. The pen position stepping resistors $R_0$ to $R_4$ in FIG. 4 also correspond to the similarly designated resistors in FIG. 7.

In addition to the above-described counter operations, the counter relays, through contacts J and K in the X ring and contacts C and D in the Y ring (FIG. 7), also provide the control signals for the scanner actuating circuit, FIG. 14. The scanner actuating circuit controls the 25-position component scanner, FIG. 13, which consists of twenty-five relays. A cross-over type matrix-select, as shown in FIG. 14, may be used to activate the relays. The X ring relay switch contacts are in series with the rows from one side of the square, the Y ring relay switch contacts are in series with the rows from an adjacent side of the square. Where the closed switches cross over, that relay is pulled, a diode is used in series with each coil so that only one relay may pull at a time. An indicator lamp in parallel with each coil indicates the scanner position by showing which scanner relay is energized and which component is then being tested. The relay solenoid coils and the matrix actuating circuit are shown in FIG. 14, the switch contacts actuated by these relay solenoid coils and their associated circuits are shown in FIG. 13. Referring to FIG. 13, the normally open contacts of the twenty-five 6-pole, double-throw relays are all tied to the six common conductors $C_v$, $B_v$, $E_v$, $E_I$, $B_I$ and $C_I$. The movable contact of each pole is connected to a component contact in the twenty-five component test board 120. In testing transistors there are two connections used for each emitter, base and collector lead of the units under test. The test input terminals are shorted to test common (ground) except during the application of a test voltage. While only two relays (numbers 0 and 5) are shown it is to be understood that in this particular embodiment 25 relays are similarly connected. The remaining twenty-three are not shown for drawing simplicity.

Figure 16:
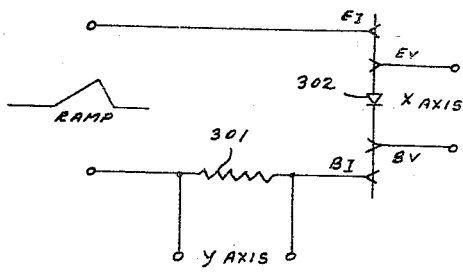
FIG. 16 is a schematic drawing showing the use of the apparatus in the electrical measurement of a diode characteristic.

The operation of the scanner actuating circuit, FIG. 14, is as follows: with the plotter in the initial zero (home base) position, counter relays $X_0$ and $Y_0$ of FIG. 7 will be pulled. Thus, the made contacts J and K of the $X_0$ relay provide +25 volts to terminal 1 of J5 (FIG. 7), which connects to terminal 1 of P5 (FIG. 14), thence to the windings of scanner relay 0, through diode 115, to terminal 10 of P5 and J5 across the made contacts C and D of relay $Y_0$, to ground. Scanner relay 0 will pull, connecting the test component located in the first jack receptacle 121 of the twenty-five component plug board 120 to the test selection points of the parameter select switch, FIG. 12. The +25 volts also illuminate the zero indicator lamp located in the scanner select indicator panel, which provides a visual indication of the scanner relay selected. In like manner, sequential pulling of counter relays $X_1$ through $X_4$ (FIG. 7) will actuate scanner relays numbers 1 through 4 (FIG. 13), with the counter relay $Y_0$ (FIG. 7) providing the common return path to ground. During the second five-count sequence of the X ring, scanner relays numbers 5 through 9 (FIG. 13) will be actuated using, in this instance, the made contacts C and D of the pulled $Y_1$ counter relay (FIG. 7) as a common return path to ground. As an example, scanner relay 5 will be actuated via the +25 volts supplied across the made contacts J and K of the pulled counter relay $X_0$, through terminal one of J5–P5, across the windings of the number 5 scanner relay, to terminal 11 of J5–P5, through the made contacts C and D of the pulled $Y_1$ counter relay (FIG. 7) to ground. Simultaneously, the +25 volts is conducted to indicator lamp number 5 of the scanner select indicator panel. The third 5-count sequence of the X ring will sequentially activate scanner relays numbers 10 through 14, with counter relay $Y_2$ providing the ground path; the fourth 5-count sequence will activate scanner relays numbers 15 through 19, with, $Y_3$ as the return to ground, and the fifth 5-count sequence of the X ring will actuate scanner relays numbers 20 through 24, with $Y_4$ as the return path to ground. FIG. 13 schematically illustrates the interconnections of the twenty-five scanner relays, the number three select relay 123, and the shorting relay 122. With scanner relay number 0 dropped, the normally closed contacts provide a short circuit to ground for the component located in the first (position zero) scanner plug-in receptacle 121. With the scanner relay 0 pulled, and assuming the shorting relay 122 pulled, the made contacts of the scanner relay provide a direct path from the component to the test points of the parameter select switch (shown in FIG. 12). The shorting relay 122 connected across the circuits to the parameter select switch, shorts out (grounds) the circuits when the scanner is switching from one component to another. FIG. 12 shows the parameter select switch circuitry required to make the proper connections for the selected test parameter. The physical switch may be a standard commercially available three-bank, twelve-pole, six-position rotary switch with one pole unused. Six poles are used to connect the six lines from the scanner, and four poles to switch the plotter inputs. For testing the reverse diode characteristics of semiconductors, i.e., CBO, EBO, and CEX, voltage sensing is made across the series combination of test component and current sensing resistor (see FIG. 2). For the forward diode characteristics, the voltage is sensed directly across the test diode as shown in simplified form in FIG. 16. Component 302 may be a diode or two elements of a transistor on which it is desired to obtain the diode characteristics. Resistor 301 is the current sensing resistor previously referred to. Referring to FIG. 16 and the plug-in twenty-five component test board partially shown, 120, FIG. 13, the double jack per component lead arrangement is electrically significant only when obtaining the forward voltage, diode, characteristics. On all other test positions of the parameter select switch 145, FIG. 12, the current and voltage test jacks are shorted together. That is, $C_I$ and $C_V$, are connected; $B_I$ and $B_V$; and $E_I$ and $E_V$. Examining FIG. 16 again, when plotting the forward voltage diode characteristics, the ramp is supplied to the component under test through jacks $E_I$ and $B_I$. Concurrently the voltage drop across the component is picked off by the test jacks $E_V$ and $B_V$. By this means only the voltage actually across the diode is measured and line loss due to the resistance of the current carrying conductors will not affect the accuracy of the test. Switch positions are also available for calibrating the test voltage and test current. The double-pole, double-throw toggle switch 140 provides the proper polarity of voltage suitable for NPN or PNP semiconductors. The shielded test leads connected in parallel with the leads to the scanner relay from poles 3, 4, 5 and 6 provide inputs to the plotting system from the test head of the automatic component handler.

The test voltage that has a linear rise and fall time is provided by either of two ramp generators. One generator provides a ramp output in four voltage ranges; 1.5, 3, 7.5 and 15 volts, with approximately 400 milliamperes of current available. The other generator provides a ramp output in six voltage ranges; 30, 60, 75, 90, 150 and 210 volts, with approximately 2 milliamperes of current available. Referring to FIGURES 9 and 10, the operation of the low voltage ramp generator is as follows. With the select switch 160 (FIG. 9) manually set to a low voltage position, that is, to a ramp voltage from 1.5 volts to 15 volts, the first select relay 161 will be pulled by the current from the +25 volt supply flowing through the made contacts of bank D of select switch 160 and the winding of the first select relay 161 to ground. The +25 volts is now available through the made contacts C and D of the first select relay 161 to pin $u$ of J2 (162). Referring to FIG. 10, the +25 volts entering from pin $u$ of P2 (170), causes a current to flow in the collector circuits of transistors 171 and 172. The +25 volts also is applied to resistor 175, in series with the base of transistor 172, through the pin connections FF and LL of P2–J2, contacts EF and GH of pulled relay 161 (FIG. 9), and the made contacts A and B of the ramp control relay 163. Assuming that the select switch 160 (FIG. 9) is in the 1.5 volt position (as it is shown in the drawing), the voltage to which the collector of transistor 176 can rise will be determined by the voltage divider network across the +25 volts from pin $t$ of J2, comprising resistors $R_1$, $R_2$, $R_3$, $R_4$ to point 164; and from point 164, the resistor $R_5$ and resistor 166, to ground, and resistor 165 through position one of bank B of select switch 160, the made contacts A and B of the pulled first select relay 161, and adjustable resistor 167 to ground. The voltage at point 164 of the divider network is conducted through the position one contacts of bank C of select switch 160, the made contacts A and B of the pulled third select relay (123, FIG. 13) to the diode 202. Diode 202 which is connected through pin A of J2 and P2 (FIG. 10) to the collector of transistor 176 clamps the ramp voltage at that set by the divider. Through the contacts L and M of pulled first select relay 161 this voltage from the collector of transistor 176 appears on conductor 168 as the testing ramp voltage. In the initial condition transistors 171, 172 and 176 are in conduction, causing the ramp output line 168 and line 169 to the low voltage capacitor bank on bank E of select switch 160 to be at ground (through connections A—A and CC—CC of J2 and P2). At time 1 of the plotting cycle, the bistable ramp control relay 163 will be pulsed breaking relay contacts A and B of said relay which in turn open the bias path to the base of transistor 172 (FIG. 10). An alternate, rapidly decaying, current path to the base of transistor 172 is provided via the low voltage capacitor network. The subsequent integrating action of transistor 176 and the capacitor network results in a ramp output, which is clamped in this instance to 1.5 volts, by the resistance network associated with position 1 of the bank B of select switch 160. With the capacitor network charged to the voltage supplied at pin A of P2, no current will be available to the base of transistor 172; all transistors will be off. When the voltage across the current sensing resistor 141 of FIG. 12 in the test circuit corresponds to a two-inch deflection in the Y-axis, the bistable ramp control relay 163 (FIG. 9) is pulsed, causing relay contacts A and B to be made. The making of said contacts provides a discharge path for the low voltage cap network on line 169. As the discharge progresses, the transistors will start to turn on, bringing the ramp output once again to ground. A degenerative feedback control is incorporated into the ramp generator by a portion of the voltage at the output of the D.C. amplifier being fed back through the coupling capacitor 200 of FIG. 9, the made contacts of bank A of select switch 160, the made contacts J and K of the pulled first select relay 161, pin HH of jack 2-plug 2, to the base of transistor 172 (FIG. 10); the effect of this feedback is to decrease the rate of change of the ramp voltage. The current control resistor 177 of FIG. 10 is used in conjunction with the voltage divider network to limit the current of the ramp output. Increasing the voltage dropped across the divider decreases the current available at the ramp output; conversely, decreasing the voltage dropped across the voltage divider results in an increase of current available at the ramp output. The slope adjusting potentiometer 178 is used to determine the slope (volts per second) of the ramp output; the zero adjusting potentiometer 179 is used to compensate for the saturation voltage drop of transistor 176. The low voltage ramp output is taken from terminal A of P2 on terminal board 170.

Referring to FIG. 11, the operation and type of circuitry used in the high voltage ramp generator is similar to that of the low voltage ramp generator and therefore will be described briefly in the areas of difference. The +400 volts for the high voltage ramp generator is received through terminal N of P1–J1 from the ramp generator control circuitry of FIG. 9. In the embodiment being described four transistors, 182, 183, 184 and 185 were required to handle the high applied voltage. Transistor 176 of FIG. 10 performed the equivalent function in the low voltage ramp generator. It is to be understood that the number of series transistors used in this part of the circuit will be a function of their voltage ratings and the output ramp voltages desired. With the select switch 160 of FIG. 9 set within the high voltage range the second select relay 201 will be pulled. The voltage divider network and the associated contacts of select switch 160 will function as previously described to supply the selected high voltage clamp voltage through the made contacts C and D of the pulled third select relay 123 of FIG. 13, through clamping diode 215, to pin X of P1. The high voltage capacitor network is connected to the generator circuitry through pin J of terminal boards J1–P1, bank F of the select switch 160, the made contacts J and K of the pulled second select relay 201, to pin D of J1 and P1. The ramp output voltages from both the high and the low voltage ramp generators leave the ramp control circuit through conductor 168 to pole 11 on the parameter select switch of FIG. 12.

Control over the test current is provided by the control circuitry comprising the D.C. amplifier 142 (FIG. 12), and in FIG. 9, transistor 211, its associated switching circuit, and the bistable ramp control relay 163. As shown in FIG. 12 the D.C. amplifier senses the voltage across the current sensing resistor 141. In this embodiment when the voltage across said resistor corresponds to a 2-inch deflection of the recorder in the Y-axis, the output of the D.C. amplifier 142 (pins 1 and 8) is approximately 2 volts. This voltage is applied across the adjustable voltage divider containing potentiometer 216 (FIG. 9) and turns the transistor switch on, which in turn pulls the ramp control relay 163 by the current flow from the +25 volt supply, through the transistor switch and the winding 217 of the relay, to ground. With the relay pulled, relay contacts A and B will be made, causing the ramp voltage to start decreasing. Contacts A and B are then opened for the next cycle by the pulsing of the ramp control relay 163 with the +25 volts of the one-time pulse. The pulsing sequence during a plotting cycle is as follows: at one-time the shorting relay 122, FIG. 13, is pulled making contacts A and B. Simultaneously, the one-time pulse is applied across the winding of the "slow pulling" relay 212 and through the contacts A and B of said relay through the upper winding of the ramp control relay 163 to ground. Relay 212 is momentarily pulled, breaking its contacts A and B, but the bistable ramp control relay 163 has been pulled causing its contacts A and B to be open. As previously described with the ramp control relay contacts open, the selected ramp generator will initiate an increasing voltage ramp output (test voltage) to the component under test. Subsequently when maximum current as evidenced by maximum deflection is reached the output from the D.C. amplifier will fire the transistor switch, which in turn pulls the ramp control relay 163 to the alternate operating state, making contacts A and B, which, in turn, reverses the slope of the voltage of the ramp generator. In the case where a test unit does not reach the predetermined maximum test current, the ramp output is reversed by the timing pulse number two. The fixed voltage divider, comprising resistors 213 and 214 across the output of the D.C. amplifier provides the degenerative feedback to the ramp generator. This feedback control allows the system to "write" a short circuit or a zener breakdown condition at approximately the same write rate as an open circuit.

Referring to FIG. 6 the contact connections of the mode switch 34 of a commercially available X–Y plotter were brought out to terminal strip J6 to provide for automatic switching of the plotter to the standby mode, and to provide control of the pen raise and lower solenoid. The relays controlling the automatic switching operation are schematically illustrated in FIG. 7; their operation is as follows. At one-time, a pulse from the programmer is applied to the normally closed contacts D and E of the function relay 80 (FIG. 8) through line EE to the closing winding of the pen operating relay 114, FIG. 7, closing its contacts A and B; which, in turn, actuate the pen solenoid in the X–Y plotter causing the pen to drop, i.e., make physical contact with the plotting paper. Subsequently (at 3-time) a pulse from the programmer is applied to the opening winding of the pen operate relay, causing said relay to pull to the alternate operating state, opening contacts A and B causing the pen solenoid to be deactivated and the pen physically removed from the plotting paper. With respect to the operating positions specified on the mode switch, the above described pulsing sequence enables the plotter to be switched automatically between the pen write and operate modes during one or more plotting cycles. At the termination of the test sequence, i.e., after the last component has been tested, a pulse is initiated by the counter (FIG. 7) on conductor 86 to pull the stop point relay 58, FIG. 8. Concurrently, said pulse will also pull the standby relay 99, FIG. 7, which will then be held via the +25 volts from the programmer (FIG. 8) by the closed contacts D and F of the pulled stop point relay (58, FIG. 8), across the windings of the standby relay to ground. With the relay pulled the normally made contacts are open, causing the machine to automatically revert to the standby mode.

The automatic cycle speed-up circuitry shown in FIG. 15 effectively overrides the programmer timing cycle to prevent any time being lost waiting for the programmer to initiate time-three sequence after the test voltage has been reversed due to maximum current having been reached. The function of this circuit is particularly useful in plotting the forward characteristics of diodes, where the test voltage is programmed such that maximum current will always be reached and the slope of the ramp will be reversed by the D.C. amplifier. For example: at the initiation of the time-one pulse, the ramp test voltage is applied to the component under test. Concurrently the D.C. amplifier senses the voltage across the current sensing resistor in the test circuit. When the predetermined maximum current is reached, the voltage across said resistor coresponds to a two-inch deflection in the Y axis (the maximum per plot in this embodiment), and the output of the D.C. amplifier is such that it actuates the turn-around relay (163, FIG. 9) causing a reversal in slope of the ramp voltage. Electrically, the forward characteristic of the diode has been plotted and the test is completed. The programmer in its normal sequencing, however, may just be terminating the first timing pulse or initiating the second timing pulse, and without the advantages of the automatic cycle speed-up circuit the system would remain idle until the third timing pulse initiates the time-three period.

The automatic cycle speed-up circuitry, FIG. 15, cooperates with the foregoing described circuits in the following manner: with the select switch 160, FIG. 9, set to a low voltage ramp range, the +25 volt supply is not connected through bank D of switch 160 to terminal F, and, hence, relay 251, FIG. 15, is not energized and the switch contacts of the relay are in the positions shown in the figure. In this condition +25 volts from terminal "H" of the programmer, FIG. 8, is applied to the collector leg of transistor 252. The emitter leg of said transistor, in the absence of output from the low voltage ramp generator, is at ground, and the base is at .3 volt. Transistor 252 is conducting, relay 254 is energized, making contacts A and B. It is assumed in describing the operation of the speed-up circuitry that switch 255 is in the "On" position so that the circuit is electrically connected through terminal "N" to stage one of the programmer.

Before initiating a one cycle or the automatic mode of operation, the function push button 56, FIG. 8, must be momentarily depressed to pull the function relay 80, FIG. 8. Thereby, through contacts B and C of function relay 80 and terminal K of FIGURES 8 and 15 the ground is supplied for winding 256a of relay 256, FIG. 15, energizing said relay and breaking contacts C and D. Transistor 253 is not conducting during this time. If the one cycle or the automatic push button is depressed, control pulse "time-one" is initiated as previously described, and concurrently, the test voltage from the low voltage ramp generator is applied to the component under test. As the current through the sensing resistor increases and the output from the D.C. amplifier approaches one volt, transistor 253 goes into conduction and its base current increases to a value that energizes winding 256b of relay 256 to the extent that said bipolar relay is energized and contacts C and D are made.

As the ramp voltages increase with a positive slope the emitter base junction of transistor 252 becomes back biased and the transistor will become cut-off dropping relay 254 and breaking contacts A and B. When the output of the D.C. amplifier reaches 2 volts, the turn-around relay 163, FIG. 9, is activated reversing the slope of the ramp voltage. As the ramp voltage is reduced to ground potential transistor 253 is cut off (the contacts of the bistable relay 256, however, remain made), and transistor 252 goes into conduction, pulling relay 254 and making contacts A and B. As previously stated, the programmer may at this time just be terminating the first control pulse or initiating the second control pulse. Whichever pulse is currently at terminal M of the programmer, it is passed through the speed-up circuit (terminals M and N) and applied as regenerative feedback to the emitter circuits of the stage one and stage two unijunction transistor timing circuits 50 and 51, FIG. 8. More specifically, the positive feedback decreases the time interval required to charge capacitor 62, FIG. 8. This fires the stage one unijunction transistor circuit early and the time-one control pulse period is terminated. After the firing of stage one, or assuming it was fired previously to the application of the feedback voltage, said feedback charging voltage is coupled to capacitor 69 causing stage two to fire thereby terminating the period of control pulse time-two and initiating control pulse time-three. The remaining stages of the programmer operate as previously described uneffected by the speed-up circuit.

When operating the system using a high-voltage ramp voltage, i.e., when select switch 160, FIG. 9, is in a position in the range of 30 to 210 volts, the +25 volt supply voltage would be available through terminal F of FIG. 9 and FIG. 15 to relay 251. Relay 251 would now be energized and contacts B and C, D and F, and G and J would be made. The voltage on the collector of transistor 252 is now supplied from terminal L of the high voltage ramp generator. The magnitude of the voltage at the collector is clamped +27 volts by the zener diodes 257, 258 and 259. The emitter of transistor 252 is now connected to the output of the high-voltage ramp generator and the base is biased at +.3 volt by the voltage divider network connected to the +400 volt supply. Diodes 260, 261, 262 and 263 provide voltage regulation in their respective divider circuits; diode 264 protects transistor 252 from the possibility of an excessive reverse potential being applied to its emitter.

Although but a single embodiment of the present invention is described in detail herein, it should be obvious to those persons skilled in the art that various changes and modifications are possible within the spirit of the invention. Therefore, it is desired that the particular form of the present invention described herein shall be considered as illustrative and not as limiting.

What is claimed is:

1. In an automatic system for measuring, plotting, and displaying the individual electrical response characteristics of a plurality of individual semiconductor electrical components, the combination comprising: individual terminal means for connecting individually to the plurality of components; voltage generating means having a ramp voltage output; a current sensing resistor; connecting means cooperating with said current sensing resistor having a voltage output proportional to current flow in said current sensing resistor; component scanning means for sequentially connecting to said individual terminal means; means connecting said voltage generating means and said current sensing resistor to said scanning means whereby said voltage output from said connecting means cooperating with said current sensing resistor will be-proportional to the current flow through said semiconductor component connected by said scanning means; means for limiting to a predetermined value the magnitude of the output of said ramp voltage generating means; means cooperating with said voltage output from connecting means cooperating with said current sensing resistor whereby the slope of said ramp voltage output is reversed at a predetermined value of current flow through said current sensing resistor; programming means generating cyclic voltage pulses, each cycle consisting of a plurality of pulses having a predetermined time relationship; means for connecting said programming means and said ramp voltage generating means whereby said ramp voltage is generated in response to said cyclic voltage pulses; X-Y plotting means having a plotting area, an X position input, a Y position input, an X axis input and a Y axis input; means cooperating with said X position input and said Y position input of plotting means dividing said plotting area into a plurality of individual smaller plotting areas; connecting means cooperating with the one axis input of said plotting means and said voltage output of said current sensing means whereby said plotting means plots a response proportional to the current flowing in said current sensing resistor; connecting means cooperating with the other axis input of said plotting means and said component scanning means whereby said plotting means plots a response proportional to the voltage across said individual semiconductor electrical component; counting means cooperating with said cyclic output of said programming means and with said component scanning means and with said X and said Y position inputs of said plotting means, whereby said plotting means is sequentially advanced one position per cycle, and said scanning means is sequentially advanced one component per cycle.

2. In an automatic system for measuring, plotting, and displaying the individual diode electrical response characteristics of a plurality of individual semiconductor electrical components, the combination comprising: individual terminal means for connecting individually to the plurality of components; voltage generating means having a ramp voltage output; a current sensing resistor; connecting means cooperating with said current sensing resistor having a voltage output proportional to current flow in said current sensing resistor; component scanning means for sequentially connecting to said individual terminal means; means connecting said voltage generating means and said current sensing resistor to said scanning means whereby said voltage output from said connecting means cooperating with said current sensing resistor will be proportional to the current flow through said individual semiconductor component connected by said scanning means; voltage limiting means limiting to a predetermined value the magnitude of the output of said ramp voltage generating means; means cooperating with said voltage output from connecting means cooperating with said current sensing resistor whereby the slope of said ramp voltage output is reversed at a predetermined value of curent flow through said current sensing resistor; programming means generating cyclic voltage pulses, each cycle consisting of a plurality of pulses having a predetermined time relationship; means for connecting said programming means and said ramp voltage generating means whereby said ramp voltage is generated in response to said cyclic voltage pulses; X-Y plotting means having a plotting area, an X position input, a Y position input, an X axis input and a Y axis input; means cooperating with said X position input and said Y position input of plotting means dividing said plotting area into a plurality of individual smaller plotting areas; connecting means cooperating with the Y axis input of said plotting means and said voltage output of said current sensing means whereby the plot of said plotting means is a response proportional to the current flowing in said current sensing resistor; connecting means cooperating with the X axis input of said plotting means and said component scanning means whereby the plot of said plotting means is a response proportional to the voltage across said individual semiconductor electrical component; counting means cooperating with said cyclic output of said programming means and with said component scanning means and with said X and said Y position inputs of said plotting means, whereby said plotting means is sequentially advanced one position per cycle, and said scanning means is sequentially advanced one component per cycle.

3. In an automatic system for measuring, plotting, and displaying the individual diode electrical response characteristics of a plurality of individual semiconductor electrical components, the combination comprising: individual terminal means for connecting individually to the plurality of components; voltage generating means having a ramp voltage output; a current sensing resistor; connecting means cooperating with said current sensing resistor having a voltage output proportional to current flow in said current sensing resistor; component scanning means for sequentially connecting to said individual terminal means; means connecting said voltage generating means and said current sensing resistor to said scanning means whereby said voltage output from said connecting means cooperating with said current sensing resistor will be proportional to the current flow through said individual semiconductor component connected by said scanning means; means for limiting to a predetermined value the magnitude of the output of said ramp voltage generating means; means cooperating with said voltage output from connecting means cooperating with said current sensing resistor and with said voltage generating means whereby the slope of said ramp voltage output is reversed at a predetermined value of current flow through said current sensing resistor; programming means comprising a plurality of adjustable, predeterminable, time delay stages, each of said time delay stages having a resistance capacitance network cooperating with a unijunction transistor, and each stage providing an output voltage pulse at the termination of its respective time delay, said delay stages being operably connected in a series time sequential relationship; means for automaticaly reinitiating said series time sequence in a cyclic relationship a predetermined number of cycles; means for connecting said programming means and said ramp voltage generating means whereby said ramp voltage is generated in response to one of said programming voltage pulses; X-Y plotting means having a plotting area, an X position input, a Y position input, an X signal axis input and a Y signal axis input; means cooperating with said X position input and said Y position input of plotting means dividing said plotting area into a plurality of individual smaller plotting areas; connecting means cooperating with the Y signal axis input of said plotting means and said voltage output of said current sensing means whereby the plot of said plotting means is a response proportional to the current flowing in said current sensing resistor; connecting means cooperating with the X signal axis input of said plotting means and said component scanning means whereby the plot of said plotting means is a response proportional to the voltage across said individual semiconductor electrical component; counting means cooperating with the output of one of the said voltage pulses of the programming means whereby said counting means advance said dividing means associated with said plotting means one of said individual small plotting areas, and advances said scanning means one component per cycle of said programming means.

4. In an automatic system for measuring, plotting, and displaying the individual diode electrical response characteristics of a plurality of individual semiconductor electrical components, the combination comprising: individual terminal means for connecting individually to the plurality of components; voltage generating means having a ramp voltage output; a current sensing resistor; connecting means cooperating with said current sensing resistor having a voltage output proportional to current flow in said current sensing resistor; component scanning means for sequentially connecting to said individual terminal means; means connecting said voltage generating means and said current sensing resistor to said scanning means whereby said voltage output from said connecting means cooperating with said current sensing resistor will be proportional to the current flow through said individual semiconductor component connected by said scanning means; means for limiting to a predetermined value the magnitude of the output of said ramp voltage generating means; means cooperating with said voltage output from connecting means cooperating with said current sensing resistor and with said voltage generating means whereby the slope of said ramp voltage output is reversed at a predetermined value of current flow through said current sensing resistor; feedback means cooperating with the said voltage output from said connecting means cooperating with the said current sensing resistor and with the said voltage generating means whereby the slope of the ramp voltage is inversely proportional to the rate of change of the current in the said current sensing resistor; programming means comprising a plurality of adjustable, predeterminable, time delay stages, each of said time delay stages having a resistance capacitance network cooperating with a unijunction transistor, and each stage providing an output voltage pulse at the termination of its respective time delay, said delay stages being operably connected in a series time sequential relationship; means for automatically reinitiating said series time sequence in a cyclic relationship a predetermined number of cycles; means for connecting said programming means and said ramp voltage generating means whereby said ramp voltage is generated in response to one of said programming voltage pulses; X-Y plotting means having a plotting area, an X position input, a Y position input, an X signal axis input and a Y signal axis input; means cooperating with said X position input and said Y position input of plotting means dividing said plotting area into a plurality of individual smaller plotting areas; connecting means cooperating with the Y signal axis input of said plotting means and said voltage output of said current sensing means whereby the plot of said plotting means is a response proportional to the current flowing in said current sensing resistor; connecting means cooperating with the X signal axis input of said plotting means and said component scanning means whereby the plot of said plotting means is a response proportional to the voltage across said individual semiconductor electrical component; counting means cooperating with the output of one of the said voltage pulses of the programming means whereby said counting means advances said dividing means associated with said plotting means one of said individual smaller plotting areas, and advances said scanning means one component, per cycle of said programming means.

5. In an automatic system for measuring, plotting, and displaying the individual diode electrical response characteristics of a plurality of individual semiconductor electrical components, the combination comprising: individual terminal means for connecting individually to the plurality of components; voltage generating means having a ramp voltage output; a current sensing resistor; connecting means cooperating with said current sensing resistor having a voltage output proportional to current flow in said current sensing resistor; component scanning means for sequentially connecting to said individual terminal means; means connecting said voltage generating means and said current sensing resistor to said scanning means whereby said voltage output from said connecting means cooperating with said current sensing resistor will be proportional to the current flow through said individual semiconductor component connected by said scanning means; means for limiting to a predetermined value the magnitude of the output of said ramp voltage generating means; means cooperating with said voltage output from connecting means cooperating with said current sensing resistor and with said voltage generating means whereby the slope of said ramp voltage output is reversed at a predetermined value of current flow through said current sensing resistor; feedback means cooperating with the said voltage output from said connecting means cooperating with the said current sensing resistor and with the said voltage generating means whereby the slope of the ramp voltage is inversely proportional to the rate of change of the current in the said current sensing resistor; programming means comprising a plurality of adjustable, predeterminable, time delay stages, each of said time delay stages having a resistance capacitance network cooperating with a unijunction transistor, and each stage providing an output voltage pulse at the termination of its respective time delay, said delay stages being operably connected in a series time sequential relationship; means for automatically reinitiating said series time sequence in a cyclic relationship a predetermined number of cycles; means for connecting said programming means and said ramp voltage generating means whereby said ramp voltage is generated in response to one of said programming voltage pulses; control means cooperating with said programming means and said ramp voltage slope reversing means whereby the cyclic operation of said programming means is accelerated to the completion of said cycle after the occurrence of said ramp reversal; X-Y plottings means having a plotting area, an X position input, a Y position input, an X signal axis input and a Y signal axis input; means cooperating with said X position input and said Y position input of plotting means dividing said plotting area into a plurality of individual smaller plotting areas; connecting means cooperating with the Y signal axis input of said plotting means and said voltage output of said current sensing means whereby the plot of said plotting means is a response proportional to the current flowing in said current sensing resistor; connecting means cooperating with the X signal axis input of said plotting means and said component scanning means whereby the plot of said plotting means is a response proportional to the voltage across said individual semiconductor electrical component; counting means cooperating with the output of one of the said voltage pulses of the programming means whereby said counting means advances said dividing means associated with said plotting means one of said individual smaller plotting areas, and advances said scanning means one component per cycle of said programming means.

6. In an automatic system for measuring, plotting, and displaying the individual diode electrical response characteristics of a plurality of individual semiconductor electrical components, the combination comprising: individual terminal means for connecting individually to the plurality of components; voltage generating means having a ramp voltage output; a current sensing resistor; connecting means cooperating with said current sensing resistor having a voltage output proportional to current flow in said current sensing resistor; component scanning means for sequentially connecting to said individual terminal means; means connecting said voltage generating means and said current sensing resistor to said scanning means whereby said voltage output from said connection means cooperating with said current sensing resistor will be proportional to the current flow through said individual semiconductor component connected by said scanning means; means for limiting to a predetermined value the magnitude of the output of said ramp voltage generating means; means cooperating with said voltage output from connecting means cooperating with said current sensing resistor and with said voltage generating means whereby the slope of said ramp voltage output is reversed at a predetermined value of current flow through said current sensing resistor; feedback means cooperating with the said voltage output from said connecting means cooperating with the said current sensing resistor and with the said voltage generating means whereby the slope of the ramp voltage is inversely proportional to the rate of change of the current in the said current sensing resistor; programming means comprising a plurality of adjustable, predeterminable, time delay stages, each of said time delay stages having a resistance capacitance network cooperating with a unijunction transistor, and each stage providing an output voltage pulse at the termination of its respective time delay, said delay stages being operably connected in a series time sequential relationship; means for automatically reinitiating said series time sequence in a cyclic relationship a predetermined number of cycles; means for connecting said programming means and said ramp voltage generating means whereby said ramp voltage is generated in response to one of said programming voltage pulses; control means cooperating with said programming means and said ramp voltage slope reversing means whereby the cyclic operation of said programming means is accelerated to the completion of said cycle after the occurrence of said ramp reversal; X-Y plotting means having a plotting area, an X position input, a Y position input, an X signal axis input and a Y signal axis input; means cooperating with said X position input and said Y position input of plotting means dividing said plotting area into a plurality of individual smaller plotting areas; connecting means cooperating with the Y signal axis input of said plotting means and said voltage output of said current sensing means whereby the plot of said plotting means is a response proportional to the current flowing in said current sensing resistor; connecting means cooperating with the X signal axis input of said plotting means and said component scanning means whereby the plot of said plotting means is a response proportional to the said ramp output voltage; counting means cooperating with the output of one of the said voltage pulses of the programming means whereby said counting means advances said dividing means associated with said plotting means one of said individual smaller plotting areas, and advances said scanning means one component per cycle of said programming means.

No references cited.

WALTER L. CARLSON, *Primary Examiner.*

E. L. STOLARUN, *Assistant Examiner.*